United States Patent
Onishi

(10) Patent No.: US 9,122,003 B2
(45) Date of Patent: Sep. 1, 2015

(54) SEMICONDUCTOR OPTICAL DEVICE

(71) Applicant: SUMITOMO ELECTRIC INDUSTRIES, LTD., Osaka-shi, Osaka (JP)

(72) Inventor: Yutaka Onishi, Yamato (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 237 days.

(21) Appl. No.: 13/933,511

(22) Filed: Jul. 2, 2013

(65) Prior Publication Data
US 2014/0023314 A1 Jan. 23, 2014

(30) Foreign Application Priority Data
Jul. 18, 2012 (JP) .................................. 2012-159906

(51) Int. Cl.
*G02B 6/12* (2006.01)
*G02B 6/122* (2006.01)
*G02B 6/125* (2006.01)
*G02B 6/28* (2006.01)

(52) U.S. Cl.
CPC .............. *G02B 6/12* (2013.01); *G02B 6/12004* (2013.01); *G02B 6/125* (2013.01); *G02B 6/1228* (2013.01); *G02B 6/2813* (2013.01)

(58) Field of Classification Search
None
See application file for complete search history.

(56) References Cited

U.S. PATENT DOCUMENTS

| | | | | |
|---|---|---|---|---|
| 5,818,989 A * | 10/1998 | Nakamura | ........................ | 385/45 |
| 5,889,906 A * | 3/1999 | Chen | ............................... | 385/28 |
| 6,411,757 B1 * | 6/2002 | Brener et al. | ..................... | 385/43 |
| 6,751,391 B2 * | 6/2004 | Sidorin | .......................... | 385/132 |
| 6,798,795 B2 * | 9/2004 | Yoo | ................................. | 372/20 |
| 7,120,350 B2 * | 10/2006 | Block et al. | ..................... | 385/146 |
| 7,302,138 B2 * | 11/2007 | Lu | ..................................... | 385/37 |
| 7,343,061 B2 * | 3/2008 | Forrest et al. | .................... | 385/14 |
| 8,053,790 B2 * | 11/2011 | Feng et al. | ........................ | 257/85 |

(Continued)

FOREIGN PATENT DOCUMENTS

JP 11-103088 A 4/1999

OTHER PUBLICATIONS

M. Oehme, J. Werner, E. Kasper, M. Jutzi, and M. Berroth, "High bandwidth Ge p-i-n photodetector integrated on Si", Applied Physics Letters, vol. 89, 07117 (2006) (No. 071117, p. 1, FIG. 1).*

*Primary Examiner* — Michelle R Connelly
*Assistant Examiner* — John M Bedtelyon
(74) *Attorney, Agent, or Firm* — Smith, Gambrell & Russell LLP.

(57) ABSTRACT

A semiconductor optical device includes a light receiving device; an optical waveguide having a mesa structure, the optical waveguide including first, second, third, and fourth waveguide portions; and a passivation layer provided on a side surface of the light receiving device. The mesa structure in the second waveguide portion has a width increasing along the waveguide axis, and the mesa structure in the third waveguide portion has a width decreasing along the waveguide axis. The second waveguide portion includes first and second regions, the first region being optically coupled to the first waveguide portion and the second region being optically coupled to the third waveguide portion. The passivation layer is provided on side surfaces of the mesa structure in the second region, the third waveguide portion, and the fourth waveguide portion. The mesa structures in the first waveguide portion and the first region have side surfaces without the passivation layer.

11 Claims, 17 Drawing Sheets

(56) References Cited

U.S. PATENT DOCUMENTS

| | | | |
|---|---|---|---|
| 8,093,080 B2* | 1/2012 | Liao et al. | 438/38 |
| 8,213,751 B1* | 7/2012 | Ho et al. | 385/14 |
| 8,269,303 B2* | 9/2012 | Fujikata et al. | 257/458 |
| 8,300,996 B2* | 10/2012 | Mathai et al. | 385/24 |
| 8,320,721 B2* | 11/2012 | Cevini et al. | 385/28 |
| 8,538,213 B2* | 9/2013 | Uchida et al. | 385/43 |
| 8,571,362 B1* | 10/2013 | Dong | 385/31 |
| 8,744,225 B2* | 6/2014 | Yoshida | 385/43 |
| 8,787,713 B2* | 7/2014 | Jeong | 385/32 |
| 8,842,946 B1* | 9/2014 | Liao et al. | 385/14 |
| 8,989,540 B2* | 3/2015 | Feng et al. | 385/43 |
| 2005/0185893 A1* | 8/2005 | Liu | 385/50 |
| 2012/0127563 A1* | 5/2012 | Farmer et al. | 359/341.3 |
| 2012/0280345 A1* | 11/2012 | Zhu et al. | 257/432 |
| 2013/0229809 A1* | 9/2013 | Hatori et al. | 362/311.01 |
| 2013/0285184 A1* | 10/2013 | Li | 257/432 |
| 2014/0254998 A1* | 9/2014 | Furuya et al. | 385/131 |
| 2014/0332918 A1* | 11/2014 | Li et al. | 257/432 |

* cited by examiner

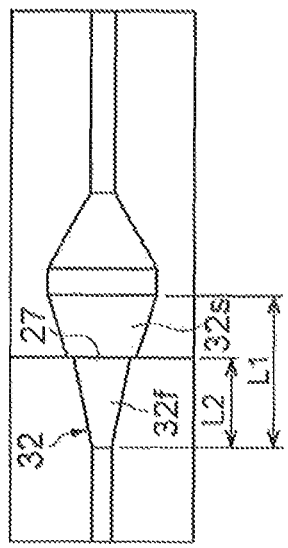
FIG. 10A
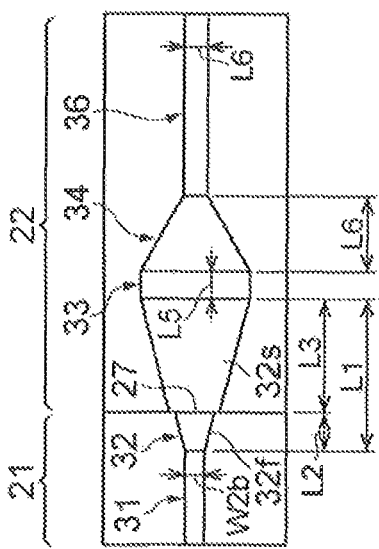
FIG. 10B
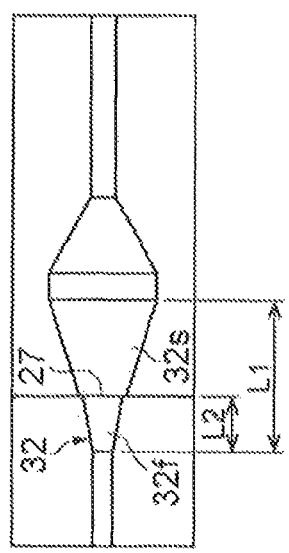
FIG. 10C
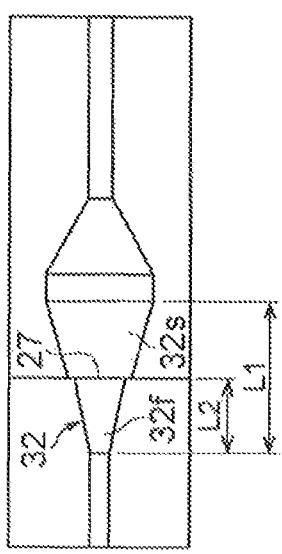
FIG. 10D
FIG. 10E

SEMICONDUCTOR OPTICAL DEVICE

BACKGROUND OF THE INVENTION

1. Field of the Invention

The present invention relates to a semiconductor optical device.

2. Description of the Related Art

Japanese Unexamined Patent Application Publication No. 11-103088 describes a waveguide type light receiving device. This light receiving device includes an optical attenuator and an optical detector that are arranged in the direction of light propagation. The optical detector has a first optical absorption layer, and the optical attenuator has the second optical absorption layer. In the light receiving device, light that propagates through the second optical absorption layer is incident on the first optical absorption layer. The optical attenuator is optically coupled to the optical detector.

SUMMARY OF THE INVENTION

Semiconductor optical devices applied for coherent optical transmission systems include a coherent mixer and a photodiode. The coherent mixer combines signal light with local oscillator light. The photodiode functions as a light receiving device.

The photodiode is provided with a protective film formed on side surfaces thereof for reducing a dark current. The photodiode is optically connected to the coherent mixer through an optical waveguide. For example, a buried type waveguide in which a mesa waveguide is embedded with a burying layer is used as the optical waveguide, and the buried type waveguide is directly connected to the photodiode. In this case, since the photodiode is provided with a protective film, the buried type waveguide is also provided with the protective film on side surfaces of the buried type waveguide. In addition, the optical waveguide provided between the coherent mixer and the photodiode further includes a high-mesa type waveguide connected to the buried type waveguide. The high-mesa type waveguide has a different structure from that of the buried type waveguide. For example, the buried type waveguide has the protective film formed on the side surfaces thereof. On the other hand, no protective film is provided on side surfaces of the high-mesa type waveguide. In this case, the buried type waveguide has a width larger than that of the high-mesa type waveguide by an amount corresponding to the thickness of the protective layer. Therefore, a step portion is formed in a connecting portion between the high-mesa type waveguide and the buried type waveguide.

When signal light is guided from the high-mesa type waveguide to the buried type waveguide through the above-described connecting portion, a part of the signal light is reflected at the connecting portion. As a result, an optical intensity fluctuation occurs at the connecting portion. As a result, the signal light to be detected by the photodiode fluctuates.

Accordingly, a semiconductor optical device according to the present invention includes a light receiving device; an optical waveguide having a mesa structure, the optical waveguide including a first waveguide portion, a second waveguide portion, a third waveguide portion, and a fourth waveguide portion, which are arranged along a waveguide axis; and a passivation layer provided on a side surface of the light receiving device. The second waveguide portion is optically coupled to the first and third waveguide portions, the mesa structure in the second waveguide portion having a width increasing along the waveguide axis. The third waveguide portion is optically coupled to the second and fourth waveguide portions, the mesa structure in the third waveguide portion having a width decreasing along the waveguide axis. The fourth waveguide portion is optically coupled to the third waveguide portion and the light receiving device. The second waveguide portion includes a first region and a second region arranged along the waveguide axis, the first region being optically coupled to the first waveguide portion and the second region being optically coupled to the third waveguide portion. In addition, the passivation layer is provided on side surfaces of the mesa structure in the second region, the third waveguide portion, and the fourth waveguide portion, and the mesa structures in the first waveguide portion and the first region have side surfaces without the passivation layer.

The second optical waveguide portion of the semiconductor optical device includes the first region on which the passivation layer is not provided and the second region on which the passivation layer is provided. Therefore, the second region has a width that is greater than a width of the first region by an amount corresponding to the thickness of the passivation layer. The optical intensity of light fluctuates when the light passes through a boundary between optical waveguides having different widths. Therefore, light that has passed through the boundary between the first and second regions and that has a fluctuating optical intensity is incident on the light receiving device. The semiconductor optical device includes the second waveguide portion having a width that increases along the waveguide axis and the third waveguide portion having a width that decreases along the waveguide axis. With this structure, the optical intensity fluctuation of the light incident on the light receiving device can be reduced.

In the semiconductor optical device according to the present invention, in the second waveguide portion, a ratio of a length of the first region to a length of the second waveguide portion is preferably set in the range of 0.4 or more and 0.6 or less. In addition, a ratio of a width of the second waveguide portion at an interface between the second waveguide portion and the third waveguide portion to a length of the second waveguide portion is preferably set to 0.148 or less. Therefore, the optical intensity fluctuation of the light incident on the light receiving device is further reduced while the optical waveguide has a low optical loss for light propagating through the optical waveguide.

In the semiconductor optical device according to the present invention, the third waveguide portion may be optically coupled to the second waveguide portion through a fifth waveguide portion interposed therebetween, the fifth waveguide portion including a mesa structure having a constant width along the waveguide axis. With this structure, the distance between the second and third waveguide portions is set to a predetermined distance.

In the semiconductor optical device according to the present invention, the passivation layer may be made of a semiconductor. Preferably, the passivation layer is made of non-doped InP.

In the semiconductor optical device according to the present invention, the second waveguide portion may have a step portion formed at a connecting portion between the first region and the second region. The step portion may have a height equal to a thickness of the passivation layer. In the optical waveguide, the fourth waveguide portion with the passivation layer has a width greater than a width of the first waveguide portion without the passivation layer. The step portion is formed at a connecting portion between the first region and the second region. However, the optical intensity fluctuation of the light incident on the light receiving device is reduced for the semiconductor optical device. In addition, dark current of the photodiode can be reduced when the passivation layer made of a semiconductor is provided on a side surface of a photodiode.

In the semiconductor optical device according to the present invention, the mesa structure in the first waveguide portion may have a width equal to a width of the mesa structure in the fourth waveguide portion.

In the semiconductor optical device according to the present invention, the mesa structure may include a first cladding layer, a second cladding layer, and a core layer sandwiched by the first and second cladding layers. Preferably, the first and second cladding layers are made of InP, and the core layer is made of InGaAs.

In the semiconductor optical device according to the present invention, the second waveguide portion may have a length that is twice a length of the third waveguide portion. With this structure, the optical intensity fluctuation of the light incident on the light receiving device can be further reduced.

BRIEF DESCRIPTION OF THE DRAWINGS

FIGS. 10A to 10E illustrate optical waveguide units in the integrated light receiving device.

DESCRIPTION OF THE PREFERRED EMBODIMENTS

Figure 1:
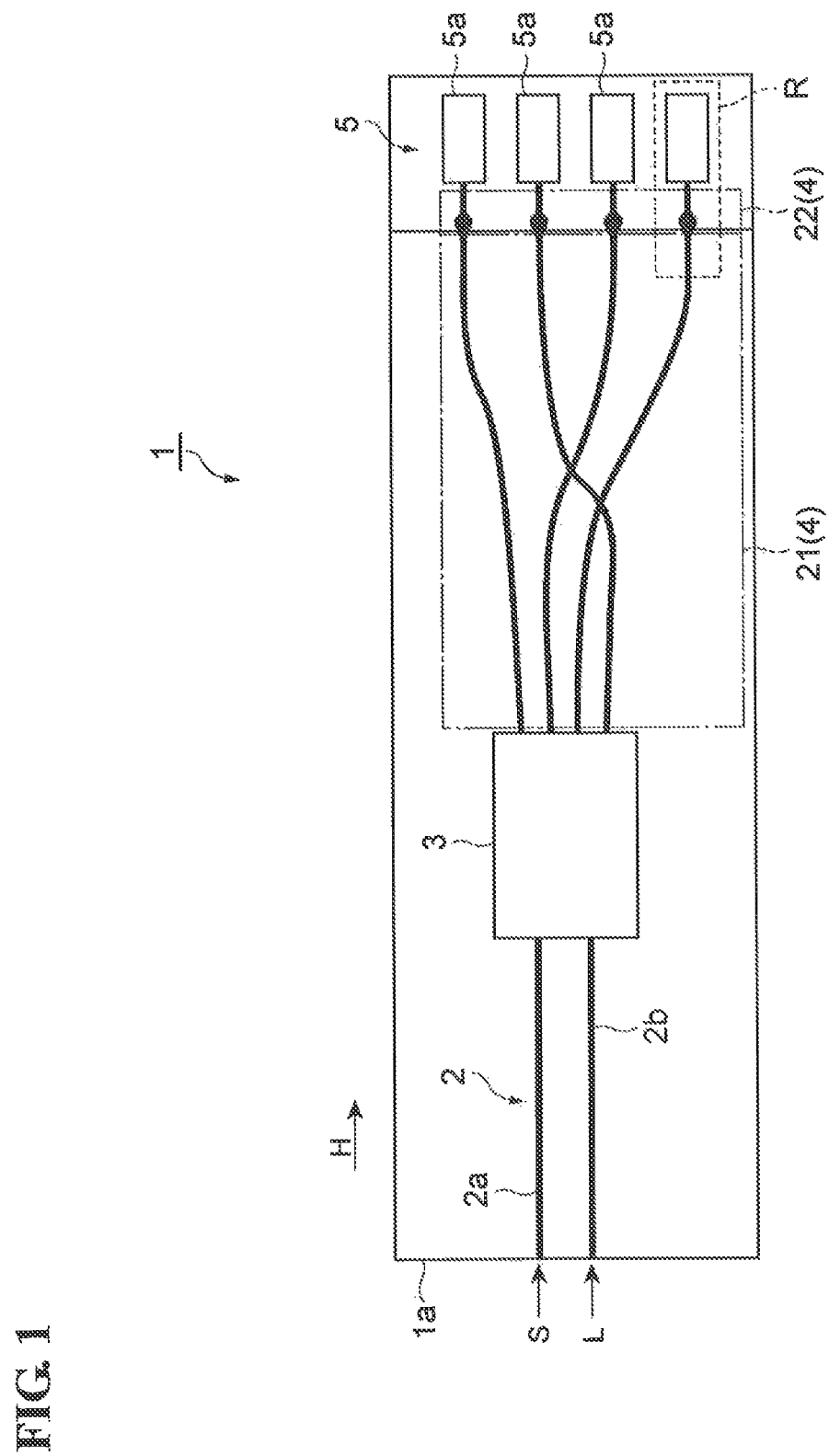
FIG. 1 illustrates an integrated light receiving device, which is an example of a semiconductor optical device according to an embodiment.

A semiconductor optical device according to an embodiment of the present invention will now be described in detail with reference to the accompanying drawings. In the drawings, the same elements are denoted by the same reference numerals, and redundant descriptions are omitted.

FIG. 1 illustrates an integrated light receiving device 1, which is an example of a semiconductor optical device according to the present embodiment. The integrated light receiving device 1 is, for example, used as a receiver in a phase-modulated optical transmission system. The integrated light receiving device 1 demodulates phase-modulated signal light and converts the signal light into an electrical signal.

The integrated light receiving device 1 includes an input waveguide unit 2, a coherent mixer 3, an optical waveguide unit 4, and a light receiving unit 5. These components of the integrated light receiving device 1 are integrated on a single semiconductor substrate.

The input waveguide unit 2 guides light that is incident thereon from the outside of the integrated light receiving device 1 to the coherent mixer 3. The input waveguide unit 2 includes a waveguide 2a that guides signal light S and a waveguide 2b that guides local oscillator light L. The waveguides 2a and 2b extend in a direction H along a waveguide axis from an end portion 1a of the integrated light receiving device 1, and are optically connected to the coherent mixer 3. The direction H along the waveguide axis is parallel to the direction of propagation of light.

In the coherent mixer 3, the signal light S and the local oscillator light L are combined. Output light propagating through the coherent mixer 3 is coupled to output ports of the coherent mixer 3. The output light from the output ports of the coherent mixer 3 has an optical intensity that changes in accordance with a phase difference between the signal light S and the local oscillator light L. The output ports of the coherent mixer 3 are connected to the optical waveguide unit 4. Accordingly, the coherent mixer 3 converts information of phase superposed on the signal light S into information of optical intensity, and light on which the information is superposed as the optical intensity is input to the optical waveguide unit 4 from the output ports of the coherent mixer 3. The light on which the information is superposed as the optical intensity is received by the light receiving unit 5. The coherent mixer 3 is, for example, a multi-mode interference (MMI) 90 degree hybrid mixer. The light demodulated by the coherent mixer 3 is guided to the light receiving unit 5 through the optical waveguide unit 4.

The light receiving unit 5 receives the signal light in which the information is converted into the optical intensity, and converts the signal light into an electrical signal. The light receiving unit 5 includes a plurality of photodiodes 5a. In the embodiment, the integrated light receiving device I includes four photodiodes 5a.

Figure 2:
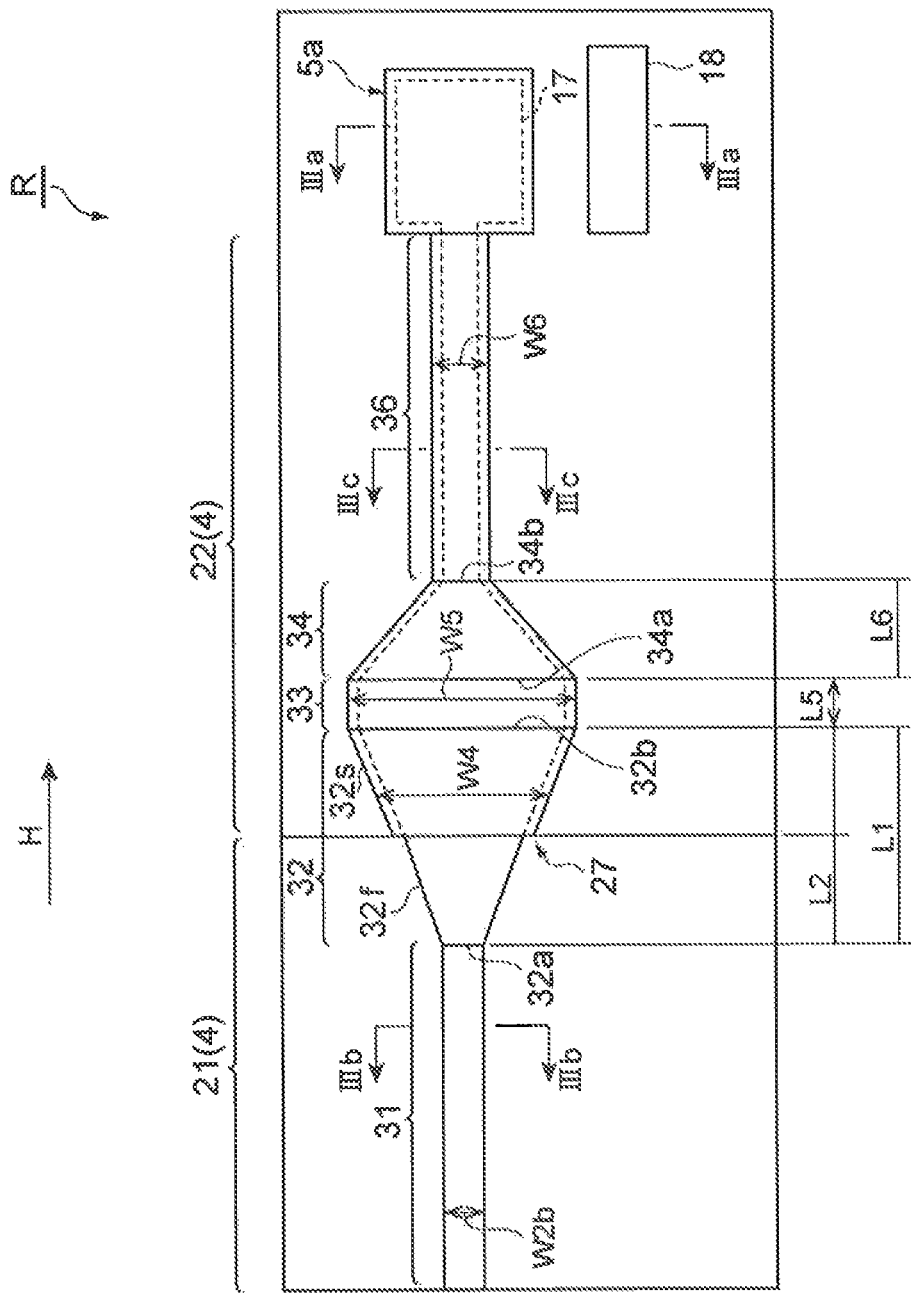
FIG. 2 is an enlarged view of a part of the integrated light receiving device according to the embodiment.
Figure 3A:
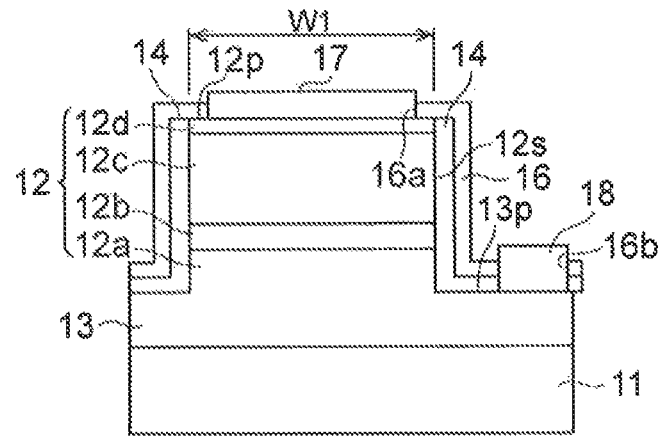
FIGS. 3A to 3C are sectional views of an optical waveguide unit and a photodiode according to the embodiment.
Figure 3B:
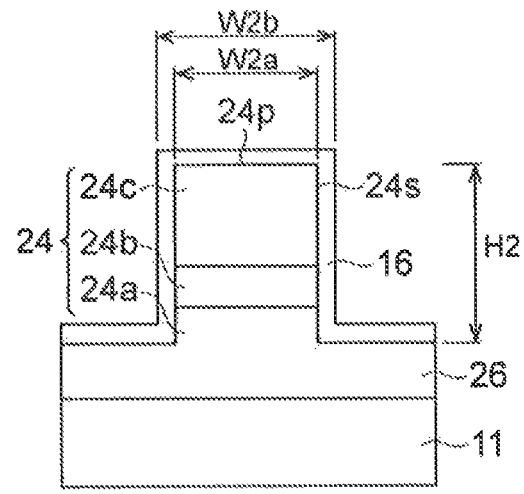
Figure 3C:
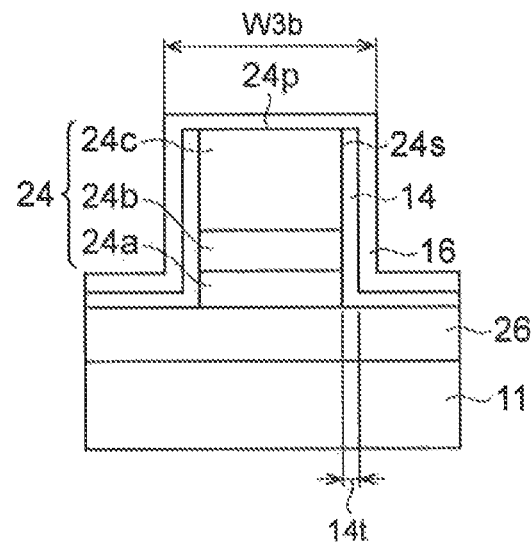

The photodiodes 5a and the optical waveguide unit 4 will now be described in detail with reference to FIGS. 2 and 3A to 3C. FIG. 2 is an enlarged view of a part (region R in FIG. 1) of the integrated light receiving device 1 according to the present embodiment. FIGS. 3A to 3C are sectional views of the optical waveguide unit 4 and each photodiode 5a according to the present embodiment.

FIG. 3A is a sectional view of the photodiode 5a taken along line IIIa-IIIa in FIG. 2. The photodiode 5a includes a stacked layer portion 12 including a plurality of semiconductor layers that are stacked on a semiconductor substrate 11. The stacked layer portion 12 has a width W1 in the range of 4 to 15 μm. In the present embodiment, the width W1 is 12 μm. A lower cladding layer 12a is provided on the semiconductor substrate 11, and an optical absorption layer 12b is provided on the lower cladding layer 12a. An upper cladding layer 12c is provided on the optical absorption layer 12b, and a contact layer 12d is provided on the upper cladding layer 12c. The optical absorption layer 12b is butt-jointed to a core layer of a buried type waveguide portion, which will be described below.

In the present embodiment, the semiconductor substrate 11 is made of a III-V group compound semiconductor such as InP. The lower cladding layer 12a is made of a III-V group compound semiconductor such as n-type InP. The lower cladding layer 12a has a thickness in the range of 0.1 to 2.0 μm. In the present embodiment, the thickness of the lower cladding layer 12a is 1.2 μm. The optical absorption layer 12b is made of a III-V group compound semiconductor such as non-doped InGaAs. The optical absorption layer 12b has a thickness in the range of 0.2 to 0.7 μm. In the present embodiment, the thickness of the optical absorption layer 12b is 0.5 μm. The upper cladding layer 12c is made of a III-V group compound semiconductor such as p-type InP. The upper cladding layer 12c has a thickness in the range of 0.3 to 1.5 μm. In the present embodiment, the thickness of the upper cladding layer 12c is 0.7 μm. The contact layer 12d is made of a III-V group compound semiconductor such as p-type InGaAs. The contact layer 12d has a thickness in the range of 0.1 to 0.5 μm. In the present embodiment, the thickness of the contact layer 12d is 0.3 μm.

A passivation layer 14 is provided on side surfaces 12s of the stacked layer portion 12 and a top surface 13p of a semiconductor layer 13 that includes the lower cladding layer 12a. The passivation layer 14 is provided to reduce dark current of the photodiode 5a. The passivation layer 14 is made of a semiconductor, for example, a III-V group compound semiconductor such as non-doped InP. The passivation layer 14 has a thickness in the range of 0.1 to 2.0 μm. In the present embodiment, the thickness of the passivation layer 14 is 0.3 μm.

An insulating film 16 is provided on a top surface 12p of the stacked layer portion 12, the passivation layer 14 on the side surfaces 12s of the stacked layer portion 12, and the passivation layer 14 on the top surface 13p of the semiconductor layer 13. The insulating film 16 is formed of a dielectric film made of, for example, $SiO_2$ or SiN. The insulating film 16 has a thickness in the range of 0.1 to 1.0 μm. In the present embodiment, the thickness of the insulating film 16 is 0.5 μm.

An opening 16a is formed in the insulating film 16 on the stacked layer portion 12. A top surface of the contact layer 12d, that is, the top surface 12p of the stacked layer portion 12, is exposed at the opening 16a. A p-side electrode 17, which is electrically connected to the contact layer 12d, is disposed in the opening 16a.

An opening 16b is formed in the passivation layer 14 and the insulating film 16 on the semiconductor layer 13. The top surface 13p of the semiconductor layer 13 is exposed at the opening 16b. An n-side electrode 18, which is electrically connected to the semiconductor layer 13, is disposed in the opening 16b.

Referring to FIG. 1, the optical waveguide unit 4 is connected to the coherent mixer 3 at one end thereof and is connected to each photodiode 5a at the other end thereof. The optical waveguide unit 4 includes a high-mesa type waveguide portion 21 that is connected to the coherent mixer 3 and a buried type waveguide portion 22 that is connected to each photodiode 5a.

FIG. 3B is a sectional view of FIG. 2 taken along line IIIb-IIIb. The high-mesa type waveguide portion 21 includes a semiconductor mesa 24 formed of a lower cladding layer 24a (first cladding layer), a core layer 24b, and an upper cladding layer 24c (second cladding layer). Side surfaces 24s and a top surface 24p of the semiconductor mesa 24 are covered with the insulating film 16. The semiconductor mesa 24 has a width W2a of 2.5 μm and a height H2 of 2.3 m, and is provided on a semiconductor layer 26. The semiconductor layer 26 is made of, for example, a III-V group compound semiconductor such as non-doped InP. The lower cladding layer 24a and the upper cladding layer 24c are made of, for example, a III-V group compound semiconductor such as non-doped InP. The core layer 24b is made of, for example, a III-V group compound semiconductor such as non-doped InGaAsP.

FIG. 3C is a sectional view of FIG. 2 taken along line IIIc-IIIc. The buried type waveguide portion 22 includes a semiconductor mesa 24 having a structure similar to that in the high-mesa type waveguide portion 21. The semiconductor mesa 24 included in the buried type waveguide portion 22 is provided with the passivation layer 14 on side surfaces 24s thereof. The passivation layer 14 is a semiconductor film made of non-doped InP. The refractive index of the passivation layer 14 is close to those of stacked semiconductor layers included in the semiconductor mesa 24. Therefore, the passivation layer 14 optically functions as a part of the waveguide in the buried type waveguide portion 22. Specifically, the passivation layer 14 provided on the side surfaces of the semiconductor mesa 24 more weakly confines light in the core layer 24b of the semiconductor mesa 24 in the buried type waveguide portion 22 as compared to the insulating film 16. Therefore, light propagating through the core layer 24b penetrates into the passivation layer 14. The insulating film 16 is provided on a top surface 24p of the semiconductor mesa 24 and the passivation layer 14.

As described above, in the high-mesa type waveguide portion 21, the passivation layer 14 is not provided on the side surfaces 24s of the semiconductor mesa 24, and the side surfaces 24s of the semiconductor mesa 24 are not covered by the passivation layer 14. In contrast, in the buried type waveguide portion 22, the passivation layer 14 is provided on the side surfaces 24s of the semiconductor mesa 24. Therefore, the buried type waveguide portion 22 has a width W3b (W6) larger than a width W2b of the high-mesa type waveguide portion 21 by an amount corresponding to the thickness of the passivation layer 14. For example, referring to FIG. 2, the width of the buried type waveguide portion 22 is larger than that of the high-mesa type waveguide portion 21 in a connecting portion 27. A step portion is formed at the connecting portion 27.

The high-mesa type waveguide portion 21 and the buried type waveguide portion 22 will be described in further detail. Referring to FIG. 2, the optical waveguide unit 4 includes a first waveguide portion 31, a second waveguide portion 32, an intermediate waveguide portion 33 (fifth waveguide portion), a third waveguide portion 34, and a fourth waveguide portion 36, which are arranged in the direction H along the waveguide axis in that order from the coherent mixer 3 to the photodiode 5a.

The first waveguide portion 31 has a constant width W2b along the direction H. As illustrated in FIG. 3B, in the first waveguide portion 31, the passivation layer 14 is not provided on the side surfaces 24s of the semiconductor mesa 24, and the insulating film 16 is directly provided on the side surfaces 24s.

The second waveguide portion 32 has a forwardly tapered shape such that the width thereof increases in the direction H along the waveguide axis. In the present embodiment, the tapered surface has a constant inclination along the direction H. The second waveguide portion 32 has a length L1 in the range of 10 to 500 μm. In the present embodiment, the length L1 is 50 μm.

One end 32a of the second waveguide portion 32 is connected to the first waveguide portion 31. Therefore, the width of the second waveguide portion 32 is equal to the width W2b of the first waveguide portion 31 at the end 32a. In the present embodiment, the width of the second waveguide portion 32 is 2.5 μm at the end 32a. The other end 32b of the second waveguide portion 32 is optically coupled to the intermediate waveguide portion 33. Therefore, the width of the second waveguide portion 32 is equal to a width W5 of the intermediate waveguide portion 33 at the end 32b. In the present embodiment, the width W5 of the intermediate waveguide portion 33 is 4.5 μm.

The second waveguide portion 32 includes a first region 32f and a second region 32s that are arranged in the direction H. The ratio of the length L2 of the first region 32f to the length L1 of the second waveguide portion 32 (L2/L1) is set in the range of 0.4 or more and 0.6 or less. In the present embodiment, the ratio of the length L2 of the first region 32f to the length L1 of the second waveguide portion 32 (L2/L1) is set to 0.5.

The passivation layer 14 is not provided on the side surfaces 24s of the semiconductor mesa 24 in the first region 32f. In other words, the insulating film 16 is directly provided on the side surfaces 24s of the semiconductor mesa 24 in the first region 32f. In the second region 32s, the passivation layer 14 is provided on the side surfaces 24s of the semiconductor mesa 24, and the insulating film 16 is provided on the passivation layer 14. Therefore, in the connecting portion 27 between the first region 32f and the second region 32s, the width of the second region 32s is larger than that of the first region 32f by an amount corresponding to the thickness of the passivation layer 14. The step portion is formed at the connecting portion 27. Therefore, the step portion has a height equal to a thickness of the passivation layer 14.

The first region 32f has a stacked semiconductor layer including the lower cladding layer 24a, the core layer 24b, and the upper cladding layer 24c that constitutes the semiconductor mesa 24. The second region 32s also has the similar stacked semiconductor layer to the first region 32f, and the stacked semiconductor layer in second region 32s also constitutes the semiconductor mesa 24. The semiconductor mesa 24 in the first region 32f and semiconductor mesa 24 in the second region 32s include the same stacked semiconductor layer including the lower cladding layer 24a, the core layer 24b, and the upper cladding layer 24c. In the present embodiment, the connecting portion 27 is a boundary between the first region 32f in which the passivation layer 14 is not provided on the side surfaces 24s of the semiconductor mesa 24 and the second region 32s in which the passivation layer 14 is provided on the side surfaces 24s of the semiconductor mesa 24. This explanation of the connecting portion 27 applies throughout the description hereinafter.

The intermediate waveguide portion 33 is provided between the second waveguide portion 32 and the third waveguide portion 34, and has a constant width W5. In the present embodiment, the width W5 of the intermediate waveguide portion 33 is 4.5 μm, and the length L5 of the intermediate waveguide portion 33 is 5 μm.

The third waveguide portion 34 has a reversely tapered shape such that the width thereof decreases in the direction H along the waveguide axis. The third waveguide portion 34 has a length L6 in the range of 5 to 400 μm. In the present embodiment, the length L6 is 25 μm.

The length L6 of the third waveguide portion 34 is set so that the ratio thereof to the length L1 of the second waveguide portion 32 is in the range of 1/5 to 1. In the present embodiment, the length L6 of the third waveguide portion 34 is set so that the ratio thereof to the length L1 of the second waveguide portion 32 is 1/2. In other words, the length L1 of the second waveguide portion 32 is set to twice the length L6 of the third waveguide portion 34.

One end 34a of the third waveguide portion 34 is connected to the intermediate waveguide portion 33. Therefore, the width of the third waveguide portion 34 is equal to the width W5 of the intermediate waveguide portion 33 at the end 34a. In the present embodiment, the width of the third waveguide portion 34 is 4.5 μm at the end 34a. The other end 34b of the third waveguide portion 34 is connected to the fourth waveguide portion 36. Therefore, the width of the third waveguide portion 34 is equal to the width W6 of the fourth waveguide portion 36 at the end 34b. As illustrated in FIG. 3C, in the third waveguide portion 34, the passivation layer 14 is provided on the side surfaces 24s of the semiconductor mesa 24.

The fourth waveguide portion 36 has a constant width along the direction H. The width W6 of the fourth waveguide portion 36 is in the range of 1.5 to 8 μm. In the present embodiment, the width W6 of the fourth waveguide portion 36 is 3.1 μm. In addition, the width of semiconductor mesa 24 in the fourth waveguide portion 36 is equal to the width W2a of the semiconductor mesa 24 in the first waveguide portion 31. Therefore, the width W6 of the fourth waveguide portion 36 is larger than the width W2b of the first waveguide portion 31 by an amount corresponding to the thickness 14t of the passivation layer 14 provided on the side surfaces 24s at both sides of the semiconductor mesa 24 in the fourth waveguide portion 36. The width W2b of the first waveguide portion 31 is 2.5 μm. Since the passivation layer 14, which has the thickness 14t of 0.3 μm, is provided on the side surfaces 24s at both sides, the width W6 of the fourth waveguide portion 36 is larger than the width W2b of the first waveguide portion 31 by an amount corresponding to the thickness 14t (0.3 μm×2=0.6 μm).

The high-mesa type waveguide portion 21 includes the first waveguide portion 31 and the first region 32f of the second waveguide portion 32. In the high-mesa type waveguide portion 21, the side surfaces 24s of the semiconductor mesa 24 is not covered by the passivation layer 14. On the other hand, the buried type waveguide portion 22 includes the second region 32s of the second waveguide portion 32, the intermediate waveguide portion 33, the third waveguide portion 34, and the fourth waveguide portion 36. In the buried type waveguide portion 22, the passivation layer 14 is provided on the side surfaces 24s of the semiconductor mesa 24.

A method for manufacturing the above-described integrated light receiving device 1 will now be described with reference to FIG. 4A to FIG. 7. First, the light receiving unit 5 is formed. A stacked semiconductor layer 41 for forming the light receiving unit 5 is grown on the semiconductor substrate 11. The stacked semiconductor layer 41 includes semiconductor layers 37, 38, 39, and 40 that are grown on the semiconductor substrate 11 in that order. At first, the semiconductor layer 37 made of n-type InP for forming the lower cladding layer is grown on the semiconductor substrate 11. The semiconductor substrate 11 is made of semi-insulating InP such as Fe-doped InP. The semiconductor layer 37 has a thickness of 1.2 μm and an impurity concentration of $5 \times 10^{18}$ cm$^{-3}$. The semiconductor layer 38 made of non-doped InGaAs for forming the optical absorption layer is grown on the semiconductor layer 37. The semiconductor layer 38 has a thickness of 0.5 μm. The semiconductor layer 39 made of p-type InP for forming the upper cladding layer is grown on the semiconductor layer 38. The semiconductor layer 39 has a thickness of 0.7 μm and an impurity concentration of $7 \times 10^{17}$ cm$^{-3}$. The semiconductor layer 40 made of p-type InGaAs for forming the contact layer is grown on the semiconductor layer 39. The semiconductor layer 40 has a thickness of 0.3 μm and an impurity concentration of $1 \times 10^{19}$ cm$^{-3}$.

Figure 4A:
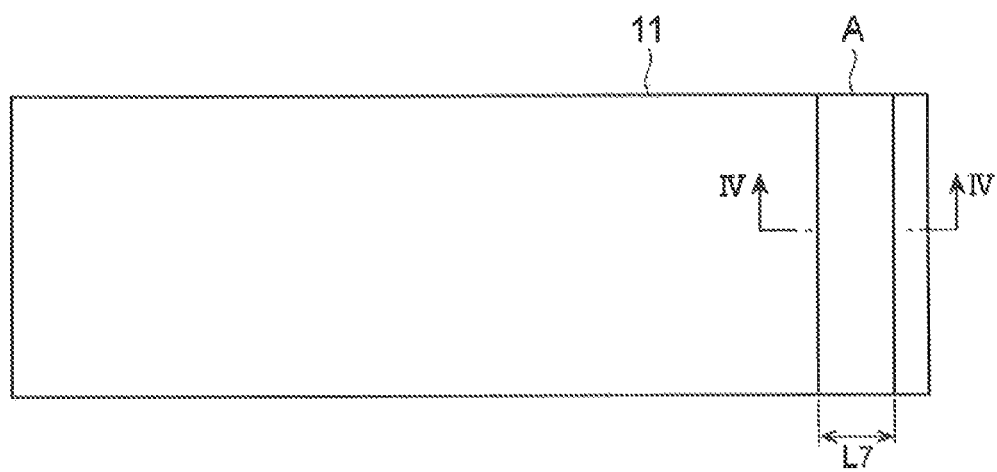
FIG. 4A illustrates a manufacturing step of the integrated light receiving device according to the embodiment.
Figure 4B:
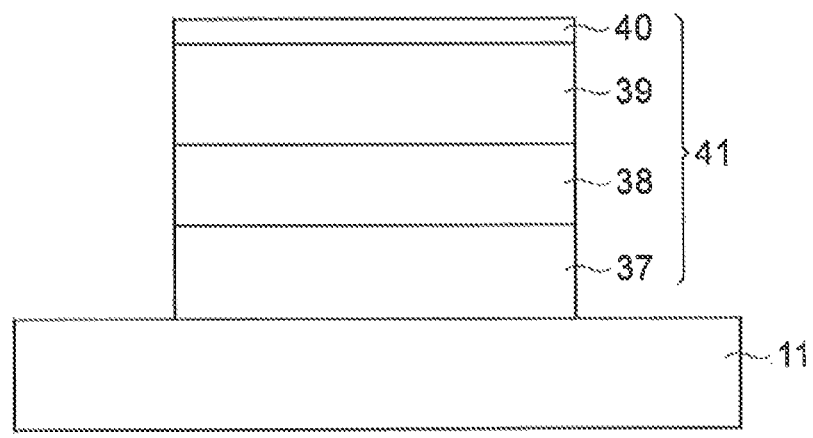
FIG. 4B is a sectional view of FIG. 4A taken along line IV-IV.

Next, as illustrated in FIGS. 4A and 4B, the semiconductor layers 37, 38, 39, and 40 are etched until the semiconductor substrate 11 is exposed in regions outside a region A in which the light receiving unit 5 is to be formed. The region A in which the light receiving unit 5 is to be formed has a length L7 of 15 μm in the direction H.

Figure 5A:
FIG. 5A illustrates a manufacturing step of the integrated light receiving device according to the embodiment.
Figure 5B:
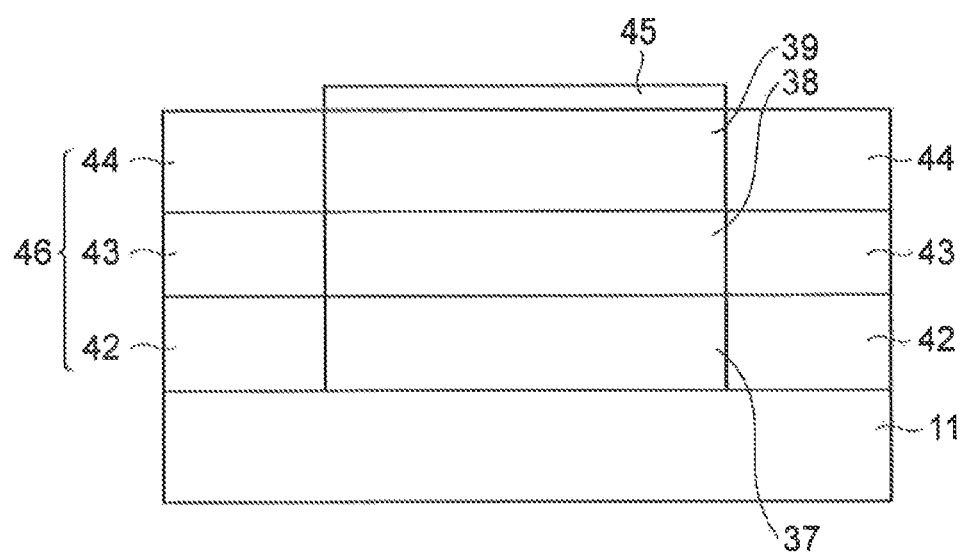
FIG. 5B is a sectional view of FIG. 5A taken along line V-V.

Next, as illustrated in FIGS. 5A and 5B, a stacked semiconductor layer 46 for forming the optical waveguide unit 4 is selectively grown on the semiconductor substrate 11. The stacked semiconductor layer 46 includes semiconductor layers 42, 43, and 44. First, a mask 45 made of a dielectric film, such as SiN or SiO$_2$, is formed on the light receiving unit 5. Next, the semiconductor layer 42 made of non-doped InP for forming the lower cladding layer 24a is grown on the semiconductor substrate 11 by using the mask 45 as a selective growth mask. The semiconductor layer 42 has a thickness of 1.2 μm. The semiconductor layer 43 made of non-doped InGaAsP for forming the core layer 24b is grown on the semiconductor layer 42. The semiconductor layer 43 has a thickness of 0.5 μm. The semiconductor layer 44 made of non-doped InP for forming the upper cladding layer 24c is grown on the semiconductor layer 43. The semiconductor layer 44 has a thickness of 1 μm. The semiconductor layer 38 for forming the optical absorption layer 12b and the semiconductor layer 43 for forming the core layer 24b are butt-jointed in growing the stacked semiconductor layer 46. An etching mask (not shown) used in etching the semiconductor layers 37, 38, 39, and 40 in the regions other than the region A in which the light receiving unit 5 is to be formed may be left unremoved and used as the mask 45.

Figure 6A:
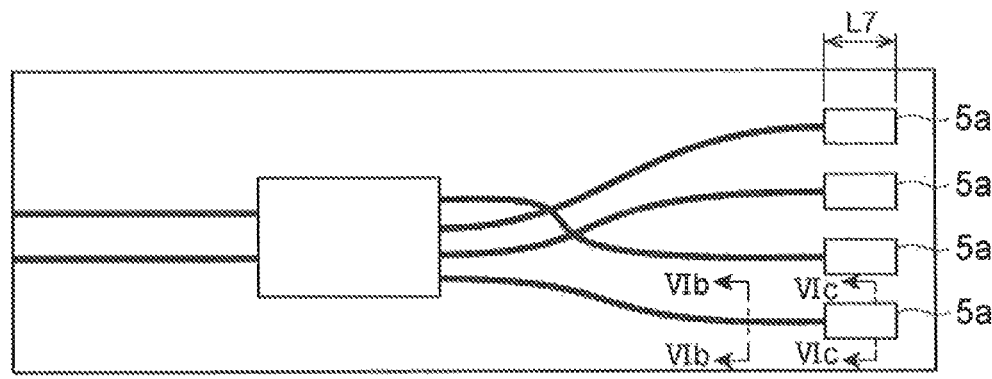
FIG. 6A illustrates a manufacturing step of the integrated light receiving device according to the embodiment.
Figure 6B:
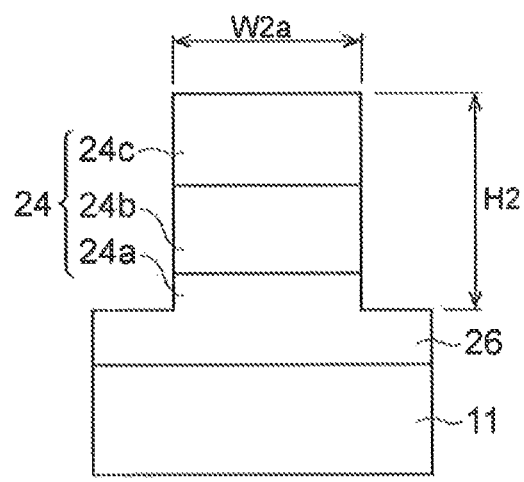
FIG. 6B is a sectional view of FIG. 6A taken along line VIb-VIb.
Figure 6C:
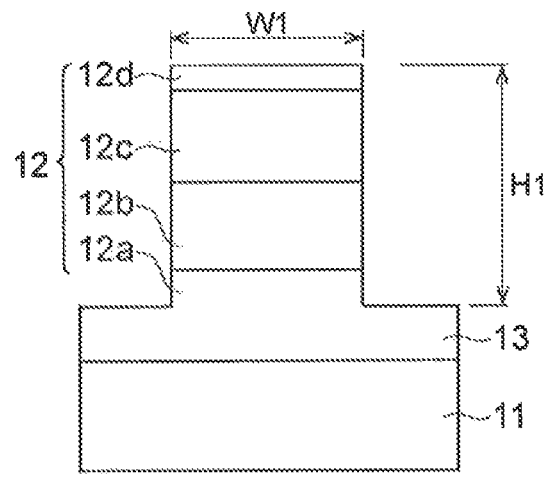
FIG. 6C is a sectional view of FIG. 6A taken along line VIc-VIc.

Next, as illustrated in FIGS. 6A and 6C, the stacked semiconductor layer 41 for forming the light receiving unit 5 is etched to form the stacked layer portion 12. The stacked layer portion 12 constitutes a semiconductor mesa for forming each photodiode 5a. The semiconductor mesa that forms a single photodiode 5a has a width W1 of 12 μm, a length L7 of 15 μm in the direction H, and a height H1 of 2.3 μm.

In addition, the stacked semiconductor layer 46 is etched to form the semiconductor mesa 24 for forming the optical waveguide unit 4. The semiconductor mesa 24 has a width W2a of 2.5 μm and a height H2 of 2.3 μm. In the etching process, dry etching may be performed.

Figure 7:
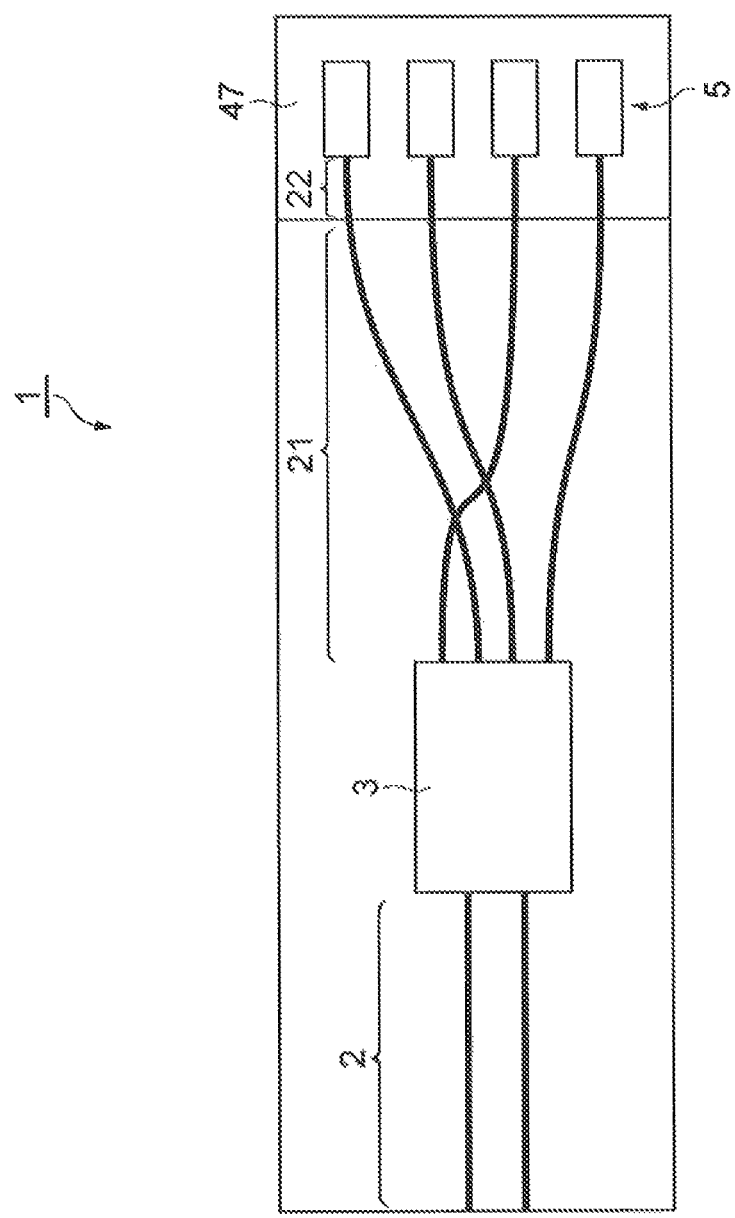
FIG. 7 illustrates a manufacturing step of the integrated light receiving device according to the embodiment.

Next, as illustrated in FIG. 7, the optical waveguide unit 4 is covered with a mask and a buried layer 47 made of InP is grown on a part of side surfaces of the semiconductor mesa 24 for forming the optical waveguide unit 4 and side surfaces of the semiconductor mesa for forming each photodiode 5a. The buried layer 47 is a layer for forming the passivation layer 14. The buried layer 47 has a thickness of 0.3 μm. Next, the insulating film 16 is formed on the optical waveguide unit 4 and the photodiodes 5a. Finally, the opening 16a is formed in the insulating film 16 on the stacked layer portion 12, and the p-side electrode 17 is disposed in the opening 16a. In addition, the opening 16b is formed in the insulating film 16 on the semiconductor substrate 11, and the n-side electrode 18 is formed in the opening 16b. The integrated light receiving device 1 is formed by the above-described steps.

Figure 8:
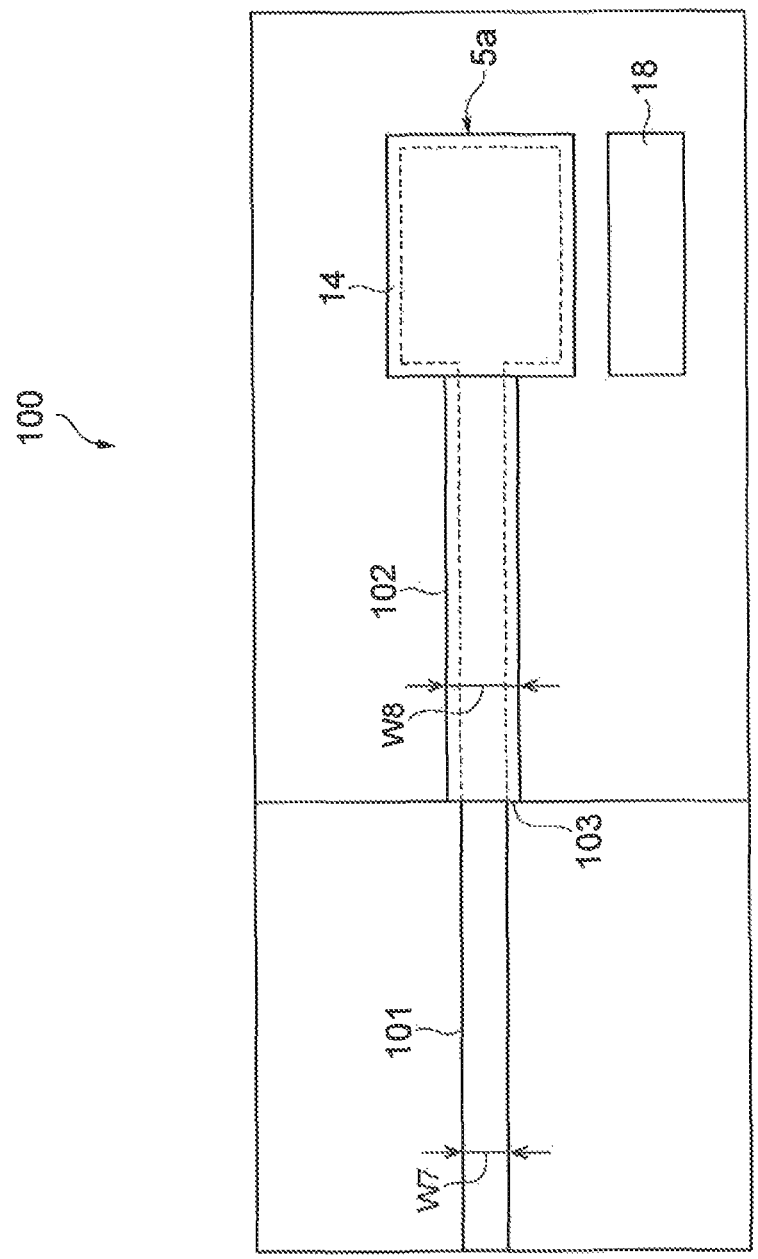
FIG. 8 is an enlarged view of a connecting portion between a high-mesa type waveguide portion and a buried type waveguide portion.

An integrated light receiving device 100 will now be described. FIG. 8 is an enlarged view of a connecting portion 103 between a high-mesa type waveguide portion 101 and a buried type waveguide portion 102 included in the integrated light receiving device 100. A passivation layer 14 is provided on side surfaces of the buried type waveguide portion 102.

As illustrated in FIG. 8, in the integrated light receiving device 100, the high-mesa type waveguide portion 101 has a constant width W7 and the buried type waveguide portion 102 has a constant width W8. A semiconductor mesa included in the high-mesa type waveguide portion 101 and a semiconductor mesa included in the buried type waveguide portion 102 have the same width. Therefore, the width W8 of the buried type waveguide portion 102 is larger than the width W7 of the high-mesa type waveguide portion 101 by an amount corresponding to the thickness of the passivation layer 14 provided on the side surfaces of the buried type waveguide portion 102. Other structures are similar to those in the integrated light receiving device 1.

Optical intensity variation of light propagating in the high-mesa type waveguide portion 101 and the buried type waveguide portion 102 of the integrated light receiving device 100 is calculated. Optical intensity fluctuation is calculated using a two dimensional beam propagation method (2D-BPM). Parameters of the high-mesa type waveguide portion 101 and the buried type waveguide portion 102 used as analytic models for the calculation are as follows:

| | |
|---|---|
| Wavelength of Incident Light | 1.55 μm |
| Thickness of First Cladding Layer of Semiconductor Mesa | 0.8 μm |
| Refractive Index of First Cladding Layer of Semiconductor Mesa | 3.1694 |
| Thickness of Second Cladding Layer of Semiconductor Mesa | 1.0 μm |
| Refractive Index of Second Cladding Layer of Semiconductor Mesa | 3.1694 |
| Thickness of Core Layer of Semiconductor Mesa | 0.5 μm |
| Refractive Index of Core Layer of Semiconductor Mesa | 3.2406 |
| Width of Semiconductor Mesa | 2.5 μm |
| Thickness of Passivation Layer | 0.3 μm |
| Refractive Index of Passivation Layer | 3.1694 |

Since the width of the semiconductor mesa is 2.5 μm, the width W7 of the high-mesa type waveguide portion 101 is also 2.5 μm. Since the thickness of the passivation layer 14 is 0.3 μm, the width W8 of the buried type waveguide portion 102 is 3.1 μm (=2.5 μm+0.3 μm×2).

Figure 9:
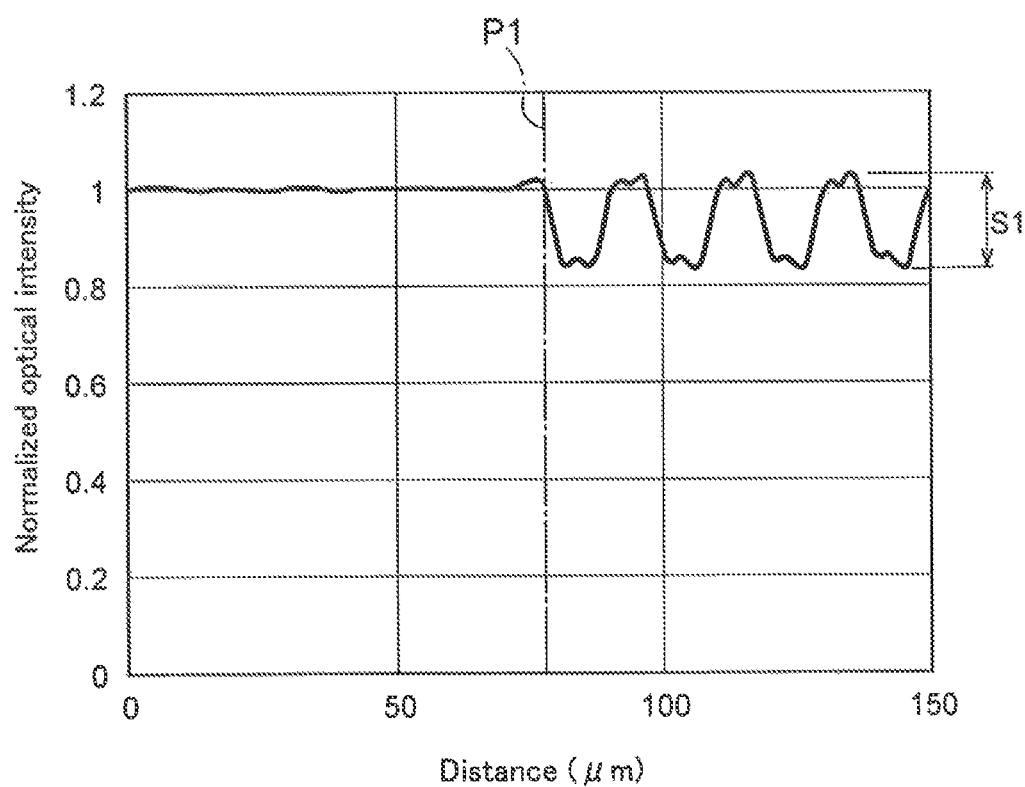
FIG. 9 is a graph showing the optical intensity fluctuation in the integrated light receiving device.

FIG. 9 shows the optical intensity of light propagating in the high-mesa type waveguide portion 101 and the buried type waveguide portion 102 along the direction H. The vertical axis of FIG. 9 represents the optical intensity normalized by the optical intensity of light incident on the high-mesa type waveguide portion 101.

Referring to FIG. 9, the optical intensity is constant until the light reaches the position indicated by reference symbol P1, which represents the connecting portion 103 between the high-mesa type waveguide portion 101 and the buried type waveguide portion 102. The optical intensity fluctuates after the light has passed the connecting portion 103. In the integrated light receiving device 100, a fluctuation range S1 between the maximum and minimum values of the optical intensity is found to be 19.8%.

Next, optical intensity variation of light propagating in the high-mesa type waveguide portion 21 and the buried type waveguide portion 22 of the integrated light receiving device 1 illustrated in FIGS. 1 and 2 is calculated. Similar to the evaluation of the integrated light receiving device 100, optical intensity fluctuation is calculated using the two dimensional beam propagation method (2D-BPM). Parameters of the high-mesa type waveguide portion 21 and the buried type waveguide portion 22 used as analytic models for the calculation are as follows:

| | |
|---|---|
| Wavelength of Incident Light | 1.55 μm |
| Thickness of First Cladding Layer of Semiconductor Mesa | 0.8 μm |
| Refractive Index of First Cladding Layer of Semiconductor Mesa | 3.1694 |
| Thickness of Second Cladding Layer of Semiconductor Mesa | 1.5 μm |
| Refractive Index of Second Cladding Layer of Semiconductor Mesa | 3.1694 |
| Thickness of Core Layer of Semiconductor Mesa | 0.5 μm |
| Refractive Index of Core Layer of Semiconductor Mesa | 3.2406 |
| Width of Semiconductor Mesa | 2.5 μm |
| Thickness of Passivation Layer | 0.3 μm |
| Refractive Index of Passivation Layer | 3.1694 |
| Length L1 of Second Waveguide Portion 32 | 50 μm |
| Length L5 of Intermediate Waveguide Portion 33 | 5 μm |
| Length L6 of Third Waveguide Portion 34 | 25 μm |

Since the width of the semiconductor mesa 24 is 2.5 μm, the width W2$b$ of the first waveguide portion 31 is also 2.5 μm. Since the thickness of the passivation layer 14 is 0.3 μm, the width W6 of the fourth waveguide portion 36 is 3.1 μm (=2.5 μm+0.3 μm×2).

The optical intensity fluctuation is evaluated while changing the position of the connecting portion 27 as illustrated in FIGS. 10A to 10E. The length L1 of the second waveguide portion 32 is fixed to 50 μm, and the length L2 of the first region 32$f$ included in the length L1 is changed.

The evaluation is performed for each of the cases in which the ratio of the length L2 of the first region 32$f$ to the length L1 of the second waveguide portion 32 (L2/L1) is set to 0.2 (FIG. 10A), 0.4 (FIG. 10B), 0.5 (FIG. 10C), 0.6 (FIG. 10D), and 0.8 (FIG. 10E).

FIGS. 11A to 13 show the optical intensity variation at the width center of the optical waveguide unit 4 along the direction H. In FIGS. 11A to 13, the vertical axis represents the optical intensity normalized by the optical intensity of light incident on the first waveguide portion 31. Reference symbol P1 indicates the position of the connecting portion 27. Reference symbol Z1 represents the first waveguide portion 31, Z2 represents the first region 32$f$ of the second waveguide portion 32, and Z3 represents the second region 32$s$ of the second waveguide portion 32. Reference symbol Z4 represents the intermediate waveguide portion 33, Z5 represents the third waveguide portion 34, and Z6 represents the fourth waveguide portion 36.

Figure 11A:
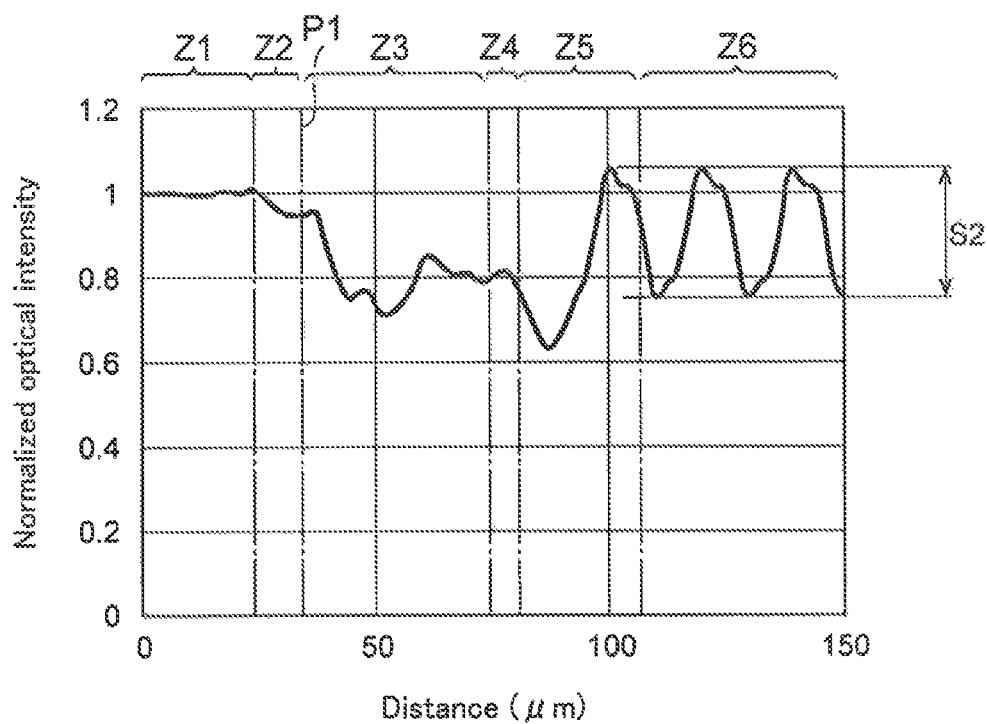
FIGS. 11A and 11B are graphs showing the optical intensity fluctuation in the integrated light receiving device.

FIG. 11A shows the result of the calculation when the ratio of the length L2 of the first region 32$f$ to the length L1 of the second waveguide portion 32 (L2/L1) is 0.2. Referring to FIG. 11A, the optical intensity is constant while the light propagates through the first waveguide portion 31 (reference symbol Z1). The optical intensity changes to about 0.62 while the light propagates through the second waveguide portion 32 and the intermediate waveguide portion 33 (reference symbols Z2 to Z4). Although the optical intensity approaches 1 while the light propagates through the third waveguide portion 34 (reference symbol Z5), the optical intensity fluctuation occurs in the fourth waveguide portion 36 (reference symbol Z6). When the ratio of the length L2 of the first region 32$f$ to the length L1 of the second waveguide portion 32 (L2/L1) is 0.2, the fluctuation range S2 is found to be 28% at a maximum.

Figure 11B:
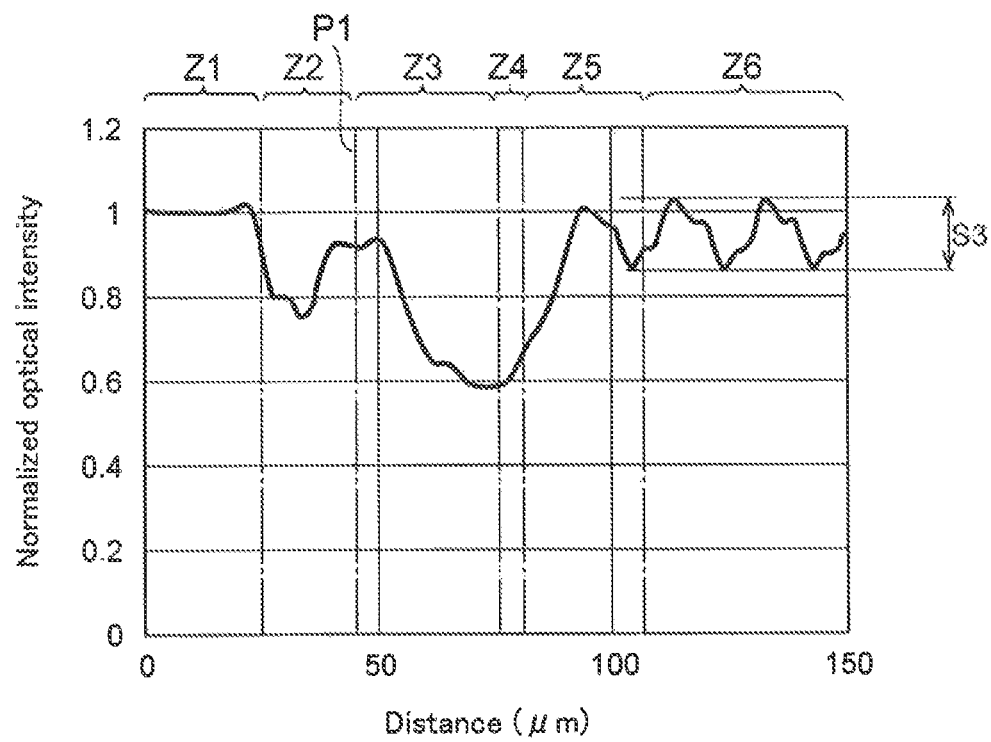

FIG. 11B shows the result of the calculation when the ratio of the length L2 of the first region 32$f$ to the length L1 of the second waveguide portion 32 (L2/L1) is 0.4. While the light propagates through the second waveguide portion 32 and the intermediate waveguide portion 33 (reference symbols Z2 to Z4), the optical intensity changes to about 0.6. Subsequently, while the light propagates through the third waveguide portion 34 (reference symbol Z5), the optical intensity approaches 1. Although the optical intensity fluctuation occurs in the fourth waveguide portion 36 (reference symbol Z6), the fluctuation range S3 is found to be 14.6% at a maximum.

Figure 12A:
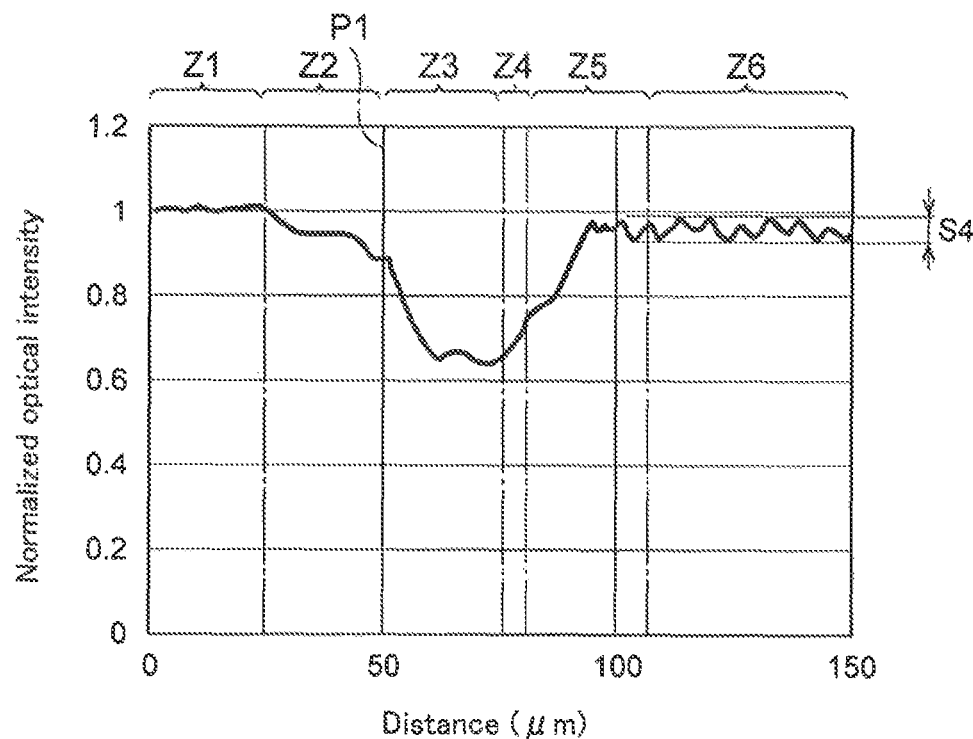
FIGS. 12A and 12B are graphs showing the optical intensity fluctuation in the integrated light receiving device.

FIG. 12A shows the result of the calculation when the ratio of the length L2 of the first region 32$f$ to the length L1 of the second waveguide portion 32 (L2/L1) is 0.5. Although the optical intensity fluctuation occurs in the fourth waveguide portion 36 (reference symbol Z6), the fluctuation range S4 is found to be 5.1% at a maximum.

Figure 12B:
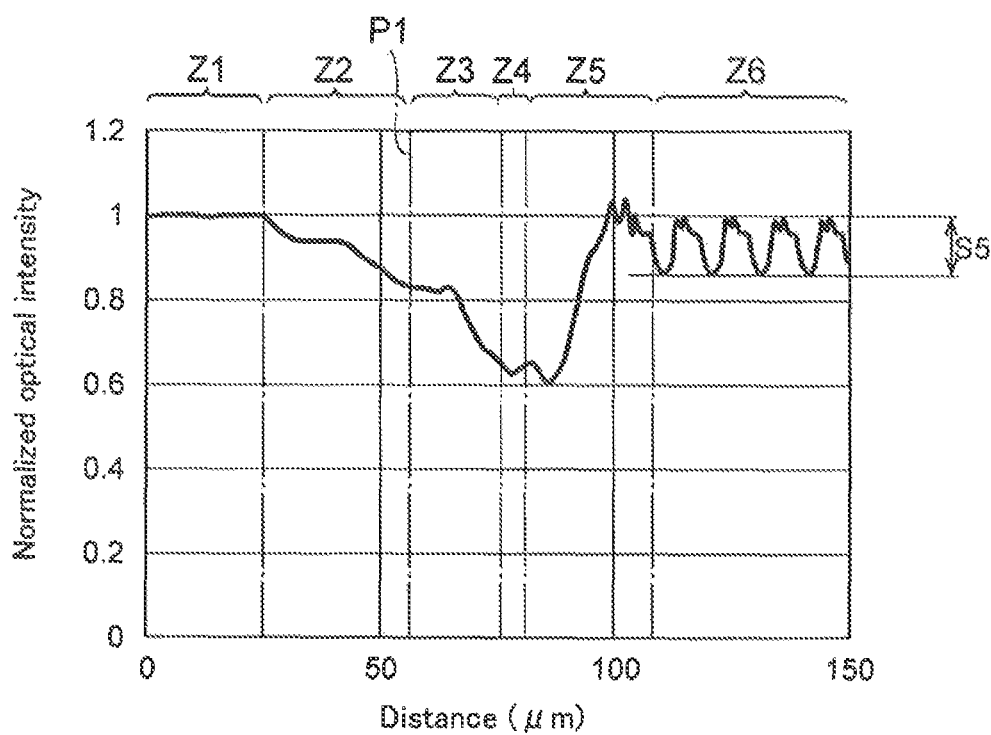

FIG. 12B shows the result of the calculation when the ratio of the length L2 of the first region 32$f$ to the length L1 of the second waveguide portion 32 (L2/L) is 0.6. Although the optical intensity fluctuation occurs in the fourth waveguide portion 36 (reference symbol Z6), the fluctuation range S5 is found to be 16.9% at a maximum.

Figure 13:
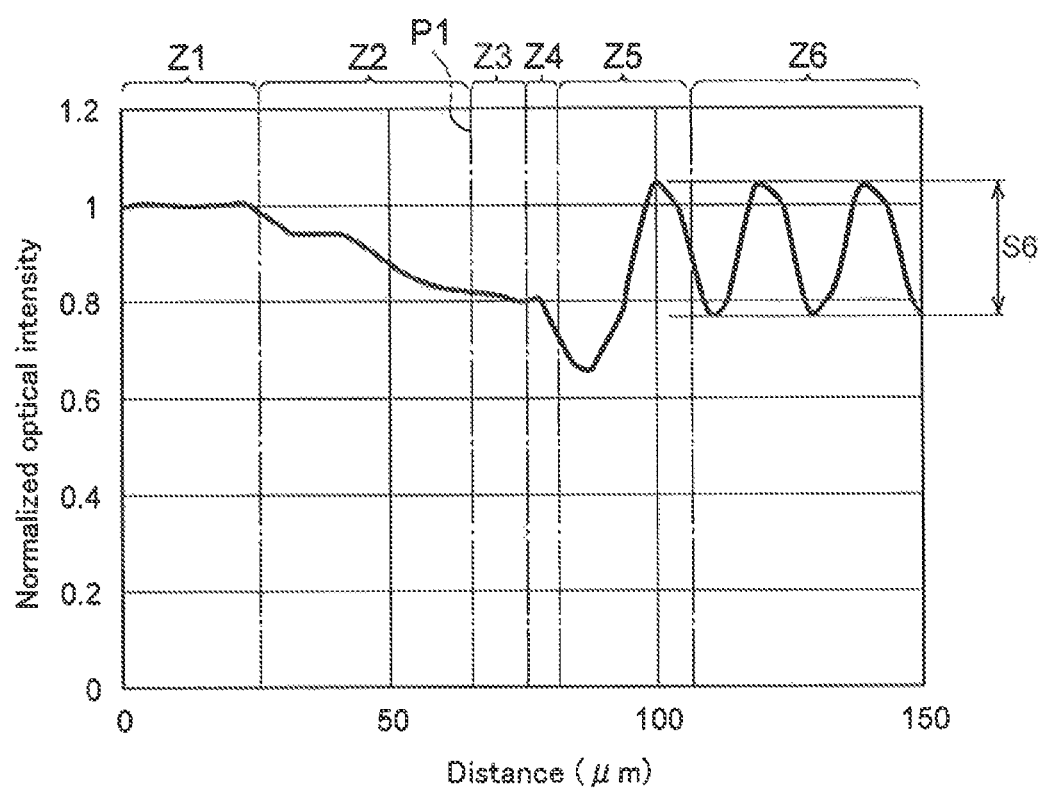
FIG. 13 is a graph showing the optical intensity fluctuation in the integrated light receiving device.

FIG. 13 shows the result of the calculation when the ratio of the length L2 of the first region 32$f$ to the length L1 of the second waveguide portion 32 (L2/L1) is 0.8. The optical intensity fluctuation occurs in the fourth waveguide portion 36 (reference symbol Z6), and the fluctuation range S6 is found to be 25.5% at a maximum.

Next, the influence of the length L1 of the second waveguide portion 32 on the optical intensity fluctuation is evaluated. Here, it is assumed that each waveguide portion have a constant width at the ends thereof. Therefore, to increase the length of a tapered portion having constant widths at the ends thereof has the same meaning as to decrease the inclination of the tapered surface. The inclination of the tapered surface decreases as the length L1 of the second waveguide portion 32 increases.

Figure 14A:
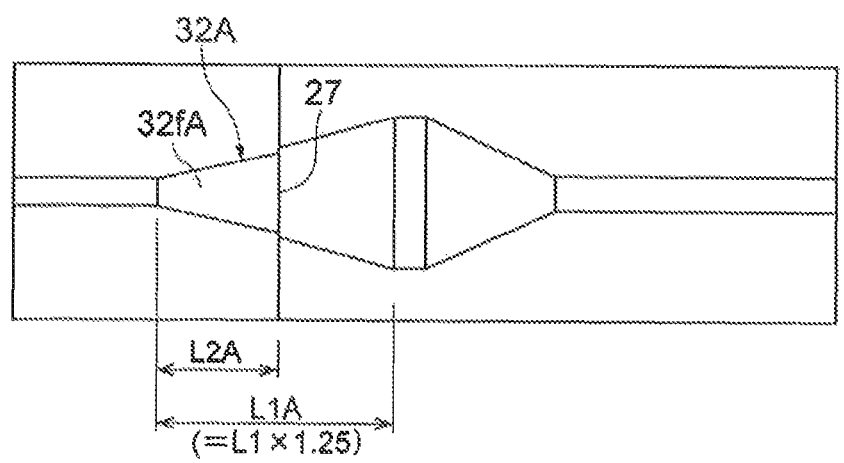
FIGS. 14A and 14B illustrate optical waveguide units of the integrated light receiving device.
Figure 14B:
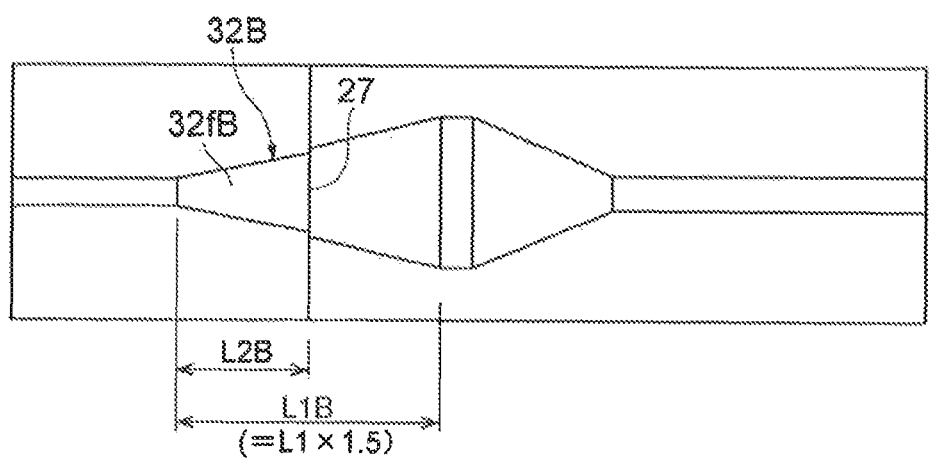

Parameters of the high-mesa type waveguide portion 101 and the buried type waveguide portion 102 used as analytic models for the calculation are similar to those of the analytic models used in the evaluation of the above-described integrated light receiving device 1. Referring to FIGS. 14A and 14B, the calculation is carried out for a second waveguide portion 32A having a length that is 1.25 times the length L1 of the second waveguide portion 32 (62.5 μm=50 μm×1.25) and a second waveguide portion 32B having a length that is 1.5 times the length L1 of the second waveguide portion 32 (75 μm=50 μm×1.5). The ratio of the lengths L2A and L2B of first regions 32$f$A and 32$f$B, respectively, to the lengths L1A and L1B of the second waveguide portions 32A and 32B, respectively, (L2A/L1A, L2B/L1B) is set to 0.5.

Figure 15A:
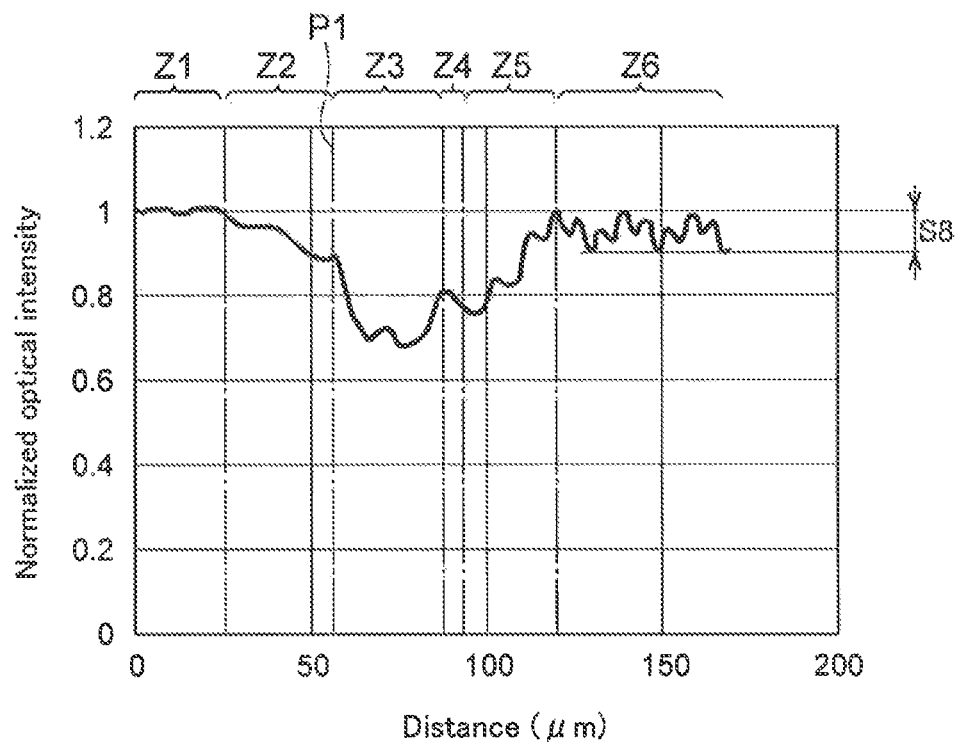
FIGS. 15A and 15B are graphs showing the optical intensity fluctuation in the integrated light receiving device.

FIG. 15A shows the result of the calculation for the second waveguide portion 32A having a length that is 1.25 times the length L1 of the second waveguide portion 32. Referring to FIG. 15A, although the optical intensity fluctuation occurs in the fourth waveguide portion 36 (reference symbol Z6), the fluctuation range S8 is found to be 10.1% at a maximum.

Figure 15B:
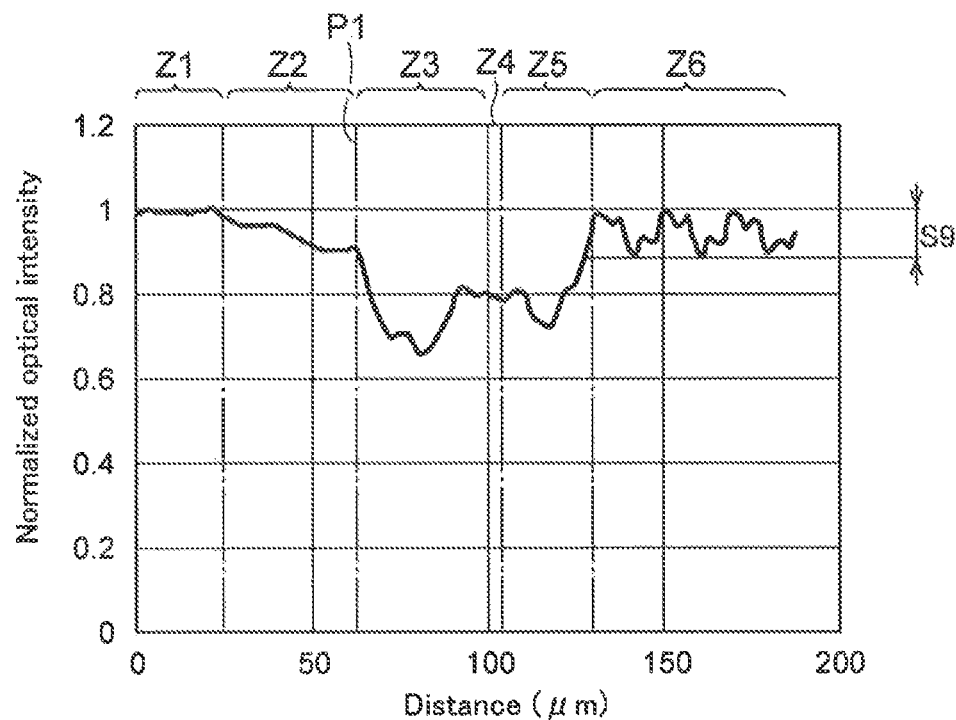

FIG. 15B shows the result of the calculation for the second waveguide portion 32B having a length that is 1.5 times the length L1 of the second waveguide portion 32. Referring to FIG. 15B, although the optical intensity fluctuation occurs in the fourth waveguide portion 36 (reference symbol Z6), the fluctuation range S9 is found to be 11.2% at a maximum.

Next, the influence of the width of the second waveguide portion 32 at the end 32$b$ (that is equal to the width W5 of the intermediate waveguide portion 33) on the optical intensity fluctuation is evaluated. In other words, the influence of increasing the inclination of the tapered surface of the second waveguide portion 32 on the optical intensity fluctuation is evaluated.

Parameters of the high-mesa type waveguide portion 101 and the buried type waveguide portion 102 used as analytic models for the calculation are similar to those of the analytic models used in the evaluation of the above-described integrated light receiving device 1. The calculation is carried out for a second waveguide portion 32 having a width at the end 32b (or W5) that is 7.4 μm and 10 μm. In the embodiment, the width of the second waveguide portion 32 is 2.5 μm at the end 32a. The length L1 and the length L2 of the first region 32f in the second waveguide portion 32 are set to 50 μm and 25 μm, respectively. In this case, the ratio of the width W5 to the length L1 of the second waveguide portion 32 (W5/L1) is 0.148 for the width W5 of 7.4 μm and 0.2 for the width W5 of 10 μm. Referring to FIG. 12A, the result of the calculation for the width W5 of 4.5 μm and the ratio of the width W5 to the length L1 of the second waveguide portion 32 (W5/L1) of 0.09.

Figure 16A:
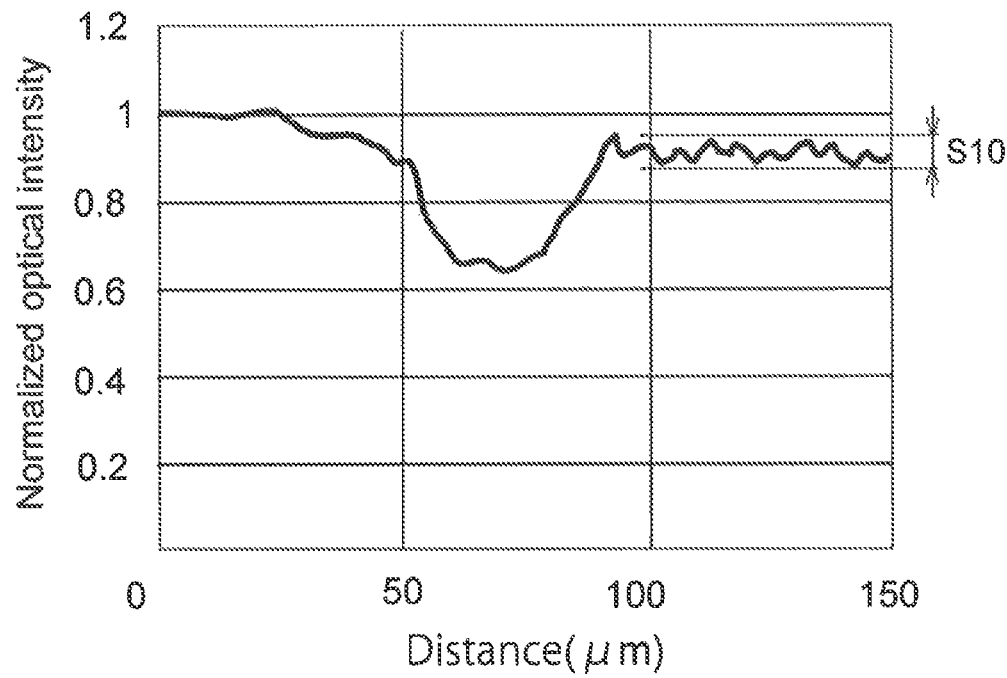
FIGS. 16A and 16B are graphs showing the optical intensity fluctuation in the integrated light receiving device.

FIG. 16A shows the result of the calculation for the width W5 of 7.4 μm (the ratio W5/L1 of 0.148). Referring to FIG. 16A, although the optical intensity fluctuation occurs in the fourth waveguide portion 36, the fluctuation range S10 is found to be 5% at a maximum. However, the optical intensity at the end of the fourth waveguide portion 36 decreases as compared to the optical intensity of light incident on the first waveguide portion 31. An optical loss for light propagating through the high-mesa type waveguide portion 21 and the buried type waveguide portion 22 increases due to the optical radiation from the taper-shaped optical waveguide. For the width W5 of 7.4 μm, the average optical loss for the light propagating through the high-mesa type waveguide portion 21 and the buried type waveguide portion 22 is about 0.5 dB.

Figure 16B:
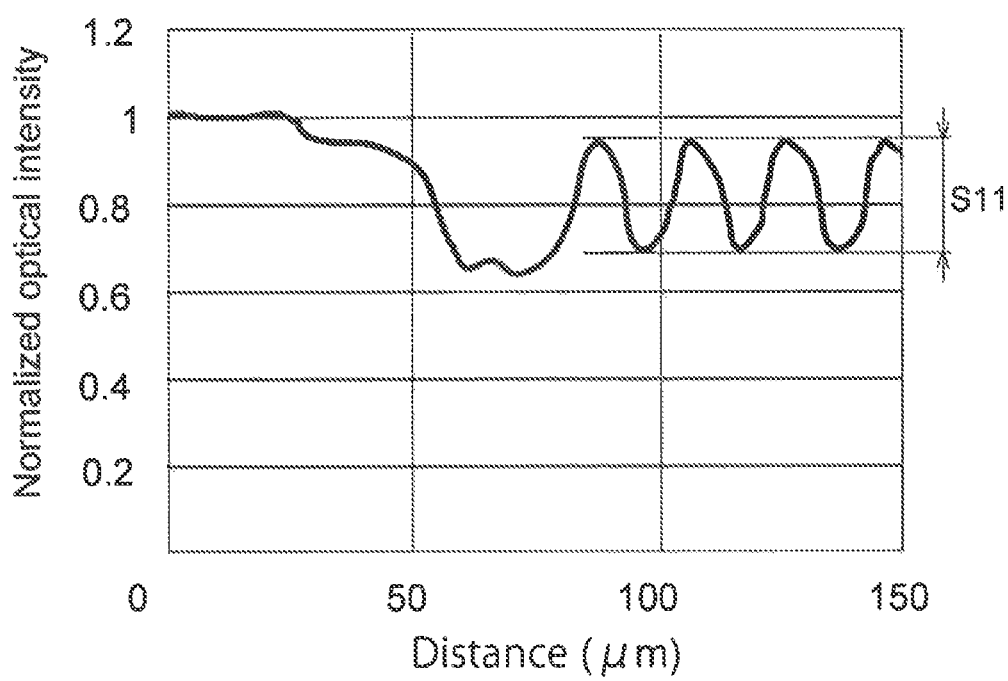

FIG. 16B shows the result of the calculation for the width W5 of 10 μm (the ratio W5/L1 of 0.2). Referring to FIG. 16B, although the optical intensity fluctuation occurs in the fourth waveguide portion 36, the fluctuation range S11 is found to be 25% at a maximum. In addition, the average optical loss for light propagating through the high-mesa type waveguide portion 21 and the buried type waveguide portion 22 increases to about 1 dB.

In each photodiode 5a, a largest amount of light is absorbed and carriers are generated at the interface between the optical absorption layer 12b and the core layer 24b of the buried type waveguide portion 22. Then, the absorption of light exponentially decreases along a traveling axis H1.

More specifically, when light having a large optical intensity is incident on the photodiode 5a, a large amount of carriers are generated in a region around the optical absorption layer 12b of the photodiode 5a that is in contact with the core layer 24b of the buried type waveguide portion 22. When a high bias voltage is applied to the photodiode 5a, the carriers are reliably removed and do not accumulate around the interface. However, when the bias voltage is low, the carriers cannot be reliably removed and accumulate around the interface. Internal space charges are generated due to the carriers that have accumulated around the interface. The internal space charges cancel an electric field applied from the outside of the integrated light receiving device. Therefore, the accumulation of the carriers around the interface leads to degradation of frequency response characteristics. In particular, the frequency response characteristics are significantly degraded when the optical intensity is large and the bias voltage applied to the photodiode 5a is low.

Figure 17A:
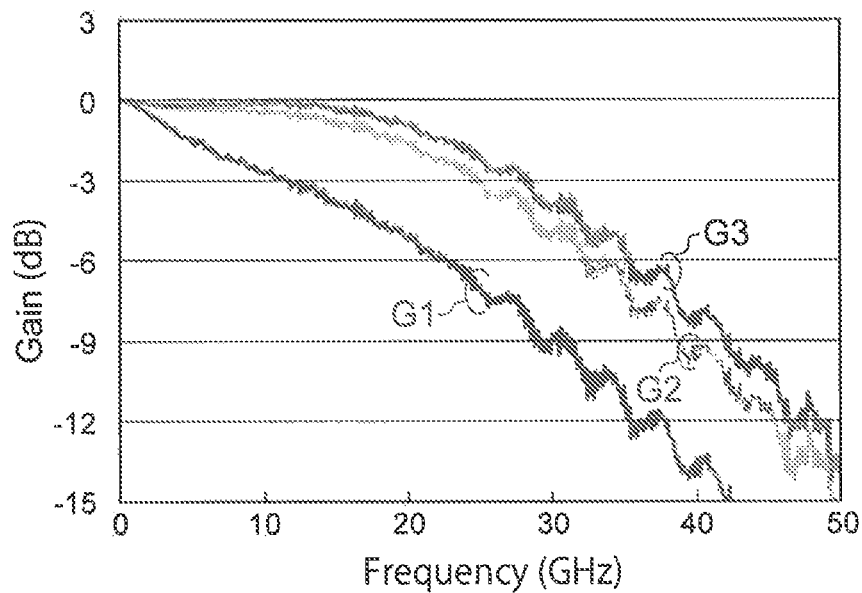
FIGS. 17A and 17B are graphs showing frequency response of the photodiode.
Figure 17B:
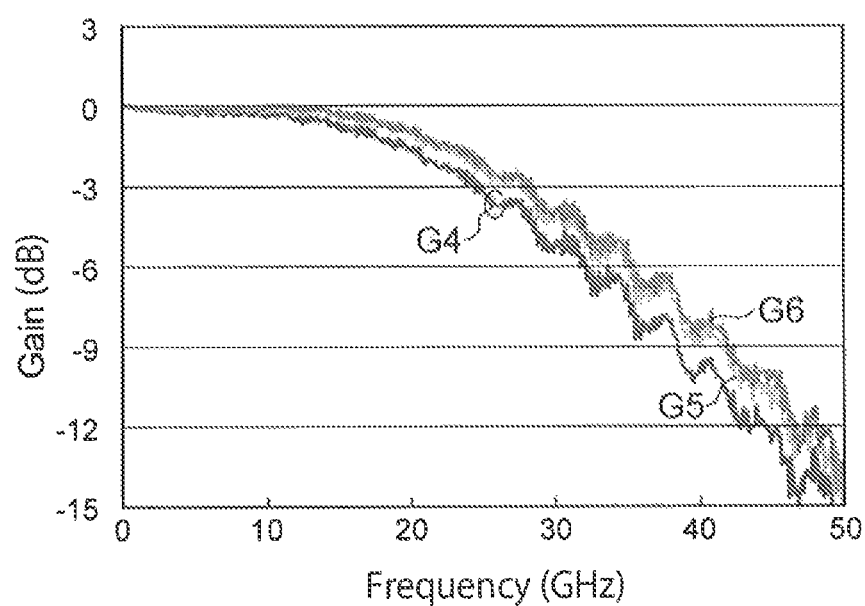

FIGS. 17A and 17B show frequency response characteristics of the photodiode 5a. FIG. 17A shows the frequency response characteristics when light having a large optical intensity is incident on the photodiode 5a. FIG. 17B shows the frequency response characteristics when light having a small optical intensity is incident on the photodiode 5a. In the graphs of FIGS. 17A and 17B, the horizontal axis represents the modulation frequency of signal light incident on the photodiode.

In FIG. 17A, curves G1, G2, and G3 show the frequency response characteristics when the bias voltage applied to the photodiode 5a is −2V, −4V, and −6V, respectively. Referring to curve G1, a frequency response band is reduced when the bias voltage applied to the photodiode 5a is −2V. Referring to curves G2 and G3, when the bias voltage is set to −4V or −6V, the frequency response band is as large as about 25 GHz. Here, the frequency response band is a frequency band in which the gain decreases by −3 dB.

In FIG. 17B, curves G4, G5, and G6 show the frequency response characteristics when the bias voltage applied to the photodiode 5a is −2V, −4V, and −6V, respectively. When the optical intensity of the light incident on the light photodiode 5a is small, the amount of carriers generated is also small. Referring to curve G4, reduction in the frequency response band is therefore suppressed even when the bias voltage is as low as −2V.

The optical intensity fluctuation occurs at the connecting portion between the high-mesa type waveguide portion and the buried type waveguide portion. When light having a fluctuation of an optical intensity is incident on the photodiode 5a, the light having the maximum optical intensity is possibly incident on the photodiode 5a. If light having a large optical intensity is incident on the photodiode 5a, a frequency response band of the photodiode 5a is reduced due to a generation of internal space charges.

In addition, when the optical intensity fluctuation occurs, the frequency response band of the photodiode 5a changes in accordance with the wavelength of light incident on the photodiode 5a. In addition, when the distance from the photodiode 5a to the connecting portion 103 varies, the intensity of light incident on the photodiode 5a also changes. Specifically, the light is incident on the photodiode 5a at either a large optical intensity or a small optical intensity. Therefore, the stable frequency response characteristics of the photodiode 5a are not maintained.

The light incident on the photodiode 5a from the coherent mixer 3 has information superposed thereon as the optical intensity. Therefore, the optical intensity fluctuation and the variation in characteristics of the photodiode 5a due to the optical intensity fluctuation may lead to quality degradation of the information superposed on the light. Accordingly, it is required that light having a small optical intensity fluctuation is incident on the photodiode 5a through an optical waveguide.

The integrated light receiving device 1 according to the present embodiment includes the second waveguide portion 32 having a width that increases in a propagation direction along the waveguide axis (that is, in the direction H) and the third waveguide portion 34 having a width that decreases in the propagation direction along the waveguide axis. The ratio of the length L2 of the first region 32f to the length L1 of the second waveguide portion 32 (L2/L1) is set in the range of 0.4 or more and 0.6 or less. Accordingly, the optical intensity fluctuation of the light that has passed through the connecting portion can be reduced. In addition, the width at the end 32b (or W5) is preferably set to 7.4 μm or less when the length L1 and the length L2 of the first region 32f in the second waveguide portion 32 are set to 50 μm and 25 μm, respectively. Therefore, the ratio of the width W5 to the length L1 of the second waveguide portion 32 (W5/L1) is preferably set to 0.148 or less. In this case, an optical loss for the light propagating through the high-mesa type waveguide portion 21 and the buried type waveguide portion 22 can be also reduced.

As a result, according to the integrated light receiving device 1 of the present embodiment, the optical intensity fluctuation that occurs at the connecting portion 27 between waveguides having different structures can be reduced. Therefore, light having a stable optical intensity can be guided to the photodiode 5a. Thus, the optical intensity fluctuation and the variation in characteristics of the photodiode 5a due to the optical intensity fluctuation can be reduced, and quality degradation of the information superposed on the light can be suppressed.

Although preferred embodiments of the present invention has been described, the present invention is not limited to the above-described embodiments. For example, each photodiode 5a of the light receiving unit 5 may be connected to optical devices other than the coherent mixer 3.

Principles of the present invention have been described on the basis of preferred embodiments with reference to the drawings. However, those skilled in the art will understand that the embodiments can be changed in terms of details without departing from the principles. Therefore, all the modifications and changes within the scope and the spirit of Claims are claimed as the present invention.

What is claimed is:

1. A semiconductor optical device, comprising:
   a light receiving device;
   an optical waveguide having a mesa structure, the optical waveguide including a first waveguide portion, a second waveguide portion, a third waveguide portion, and a fourth waveguide portion, which are arranged along a waveguide axis; and
   a passivation layer provided on a side surface of the light receiving device,
   wherein the second waveguide portion is optically coupled to the first and third waveguide portions, the mesa structure in the second waveguide portion having a width increasing along the waveguide axis,
   the third waveguide portion is optically coupled to the second and fourth waveguide portions, the mesa structure in the third waveguide portion having a width decreasing along the waveguide axis,
   the fourth waveguide portion is optically coupled to the third waveguide portion and the light receiving device,
   the second waveguide portion includes a first region and a second region arranged along the waveguide axis, the first region being optically coupled to the first waveguide portion and the second region being optically coupled to the third waveguide portion,
   the passivation layer is provided on side surfaces of the mesa structure in the second region, the third waveguide portion, and the fourth waveguide portion, and
   the mesa structures in the first waveguide portion and the first region have side surfaces without the passivation layer.

2. The semiconductor optical device according to claim 1, wherein, in the second waveguide portion, a ratio of a length of the first region to a length of the second waveguide portion is set in the range of 0.4 or more and 0.6 or less.

3. The semiconductor optical device according to claim 1, wherein, in the second waveguide portion, a ratio of a width of the second waveguide portion at an interface between the second waveguide portion and the third waveguide portion to a length of the second waveguide portion is set to 0.148 or less.

4. The semiconductor optical device according to claim 1, wherein the third waveguide portion is optically coupled to the second waveguide portion through a fifth waveguide portion interposed therebetween, the fifth waveguide portion including a mesa structure having a constant width along the waveguide axis.

5. The semiconductor optical device according to claim 1, wherein the passivation layer is made of a semiconductor.

6. The semiconductor optical device according to claim 5, wherein the passivation layer is made of non-doped InP.

7. The semiconductor optical device according to claim 1, wherein the second waveguide portion has a step portion formed at a connecting portion between the first region and the second region, and
   the step portion has a height equal to a thickness of the passivation layer.

8. The semiconductor optical device according to claim 1, wherein the mesa structure in the first waveguide portion has a width equal to a width of the mesa structure in the fourth waveguide portion.

9. The semiconductor optical device according to claim 1, wherein the mesa structure includes a first cladding layer, a second cladding layer, and a core layer sandwiched by the first and second cladding layers.

10. The semiconductor optical device according to claim 9, wherein the first and second cladding layers are made of InP, and
    the core layer is made of InGaAs.

11. The semiconductor optical device according to claim 1, wherein the second waveguide portion has a length that is twice a length of the third waveguide portion.

* * * * *